(12) United States Patent
Springer

(10) Patent No.: US 12,134,551 B2
(45) Date of Patent: Nov. 5, 2024

(54) BEVERAGE DISPENSING SYSTEMS AND METHODS THEREOF

(71) Applicant: Grinon Industries, Indianapolis, IN (US)

(72) Inventor: Joshua Springer, Indianapolis, IN (US)

(73) Assignee: Grinon Industries, Indianapolis, IN (US)

( * ) Notice: Subject to any disclaimer, the term of this patent is extended or adjusted under 35 U.S.C. 154(b) by 953 days.

(21) Appl. No.: 16/980,340

(22) PCT Filed: Mar. 11, 2019

(86) PCT No.: PCT/US2019/021666
§ 371 (c)(1),
(2) Date: Sep. 11, 2020

(87) PCT Pub. No.: WO2019/177995
PCT Pub. Date: Sep. 19, 2019

(65) Prior Publication Data
US 2021/0039942 A1    Feb. 11, 2021

Related U.S. Application Data

(60) Provisional application No. 62/641,816, filed on Mar. 12, 2018.

(51) Int. Cl.
*B67D 1/08*    (2006.01)
*B67D 1/12*    (2006.01)
(Continued)

(52) U.S. Cl.
CPC ......... *B67D 1/0888* (2013.01); *B67D 1/0894* (2013.01); *B67D 1/1277* (2013.01);
(Continued)

(58) Field of Classification Search
CPC .. B67D 1/0888; B67D 1/0894; B67D 1/1277; G06Q 20/326; G06Q 20/18;
(Continued)

(56) References Cited

U.S. PATENT DOCUMENTS 4,877,065 A * 10/1989 Lamboy .................... B65B 3/06
    141/319
7,708,035 B2 * 5/2010 Windmiller .......... B65D 47/248
    220/709

(Continued)

FOREIGN PATENT DOCUMENTS

WO    2019/177995 A1    9/2019

OTHER PUBLICATIONS

PCT/US2019/021666 filed Mar. 11, 2019 International Search Report dated Jul. 5, 2019.

*Primary Examiner* — Charles P. Cheyney
(74) *Attorney, Agent, or Firm* — Rutan & Tucker LLP

(57) ABSTRACT

Disclosed herein is beverage dispensing system including, in some embodiments, a housing including a dispensing platform, one or more valves at least partially below the dispensing platform, one or more valve-controlling modules respectively disposed in one or more cutouts of the housing, and an embedded system including the one or more valve-controlling modules and a central module communicatively coupled to the one or more valve-controlling modules. Each valve may include a beverage-container coupler extending from the valve through a corresponding opening in the dispensing platform configured to couple with bottom-fillable beverage containers for use with the beverage dispensing system. Each valve-controlling module may include a user-facing touchpad with one or more buttons configured to control a corresponding valve of the one or more valves. The embedded system may be configured for beverage dispen- (Continued)

sation as well as analytics, communications, payment processing, or a combination thereof related to beverage dispensation.

9 Claims, 21 Drawing Sheets

(51) Int. Cl.
    *G01S 19/13*     (2010.01)
    *G06F 17/18*     (2006.01)
    *G06K 7/10*     (2006.01)
    *G06Q 20/18*     (2012.01)
    *G06Q 20/20*     (2012.01)
    *G06Q 20/32*     (2012.01)
    *G06Q 30/0601*     (2023.01)
    *G06F 3/04842*     (2022.01)

(52) U.S. Cl.
    CPC .............. *G01S 19/13* (2013.01); *G06F 17/18* (2013.01); *G06K 7/10297* (2013.01); *G06K 7/10415* (2013.01); *G06Q 20/18* (2013.01); *G06Q 20/202* (2013.01); *G06Q 20/204* (2013.01); *G06Q 20/326* (2020.05); *G06Q 20/3278* (2013.01); *G06Q 30/0607* (2013.01); *G05B 2219/2645* (2013.01); *G06F 3/04842* (2013.01)

(58) Field of Classification Search
    CPC .............. G06Q 20/202; G06Q 20/204; G06Q 20/3278; A47G 19/2205
    USPC ........................................ 141/113; 222/1, 23
    See application file for complete search history.

(56) References Cited

U.S. PATENT DOCUMENTS

| | | | |
|---|---|---|---|
| 8,151,838 B2* | 4/2012 | Seaborne | B65D 1/06 |
| | | | 141/356 |
| 8,899,281 B2* | 12/2014 | Russell | A47G 19/2205 |
| | | | 141/113 |
| 8,997,803 B2* | 4/2015 | Fallon | B67D 1/0888 |
| | | | 141/198 |
| 11,247,893 B2* | 2/2022 | Rudick | B67D 1/0888 |
| 11,738,986 B2* | 8/2023 | Mullenaux | B67D 1/0894 |
| | | | 141/113 |
| 2008/0223478 A1* | 9/2008 | Hantsoo | B67D 1/0894 |
| | | | 141/2 |
| 2010/0170916 A1* | 7/2010 | Segers | B67D 1/07 |
| | | | 222/1 |
| 2011/0121020 A1 | 5/2011 | Springer | |
| 2011/0278191 A1 | 11/2011 | Lillard, Jr. | |
| 2014/0316916 A1* | 10/2014 | Hay | G06Q 20/20 |
| | | | 705/17 |
| 2014/0332113 A1* | 11/2014 | Springer | F16K 31/10 |
| | | | 141/94 |
| 2016/0096715 A1 | 4/2016 | Segiet et al. | |
| 2017/0088410 A1* | 3/2017 | Wing | B67D 1/0022 |
| 2017/0174496 A1* | 6/2017 | Gold | G06F 3/041 |
| 2021/0139309 A1* | 5/2021 | Alpmen | B67D 1/0888 |

* cited by examiner

BEVERAGE DISPENSING SYSTEMS AND METHODS THEREOF

CROSS-REFERENCE

This application is a U.S. national stage of International Application No. PCT/US2019/021666, filed Mar. 11, 2019, which claims the benefit of priority of U.S. Provisional Patent Application No. 62/641,816, filed Mar. 12, 2018, titled "Beverage Dispensing Systems And Methods Thereof," each of which is incorporated herein by reference in its entirety.

BACKGROUND

Various types of containers are designed to hold beverages, from cans and bottles, to cardboard boxes and wooden casks. Beverages can be stored in large containers and transferred to relatively small containers for consumption by way of a spout, hose, facet, tap, or fountain. Such transfer methods fill a beverage container from a top of the beverage container or through a surface of a beverage already in the beverage container. However, filling a beverage container from the top of the beverage container can increase foam of carbonated beverages. To reduce excess foam, a pourer generally pours out the excess from the beverage container, thereby wasting the beverage. Alternatively, the pourer can wait for the excessive foam to settle, which requires extra time and attention.

Accordingly, top-filling beverage dispensing systems and methods generally require a pourer to perform a number of actions, including properly positioning the beverage container, starting the flow of the beverage, stopping the flow of the beverage, and removing the beverage container form the beverage dispensing system, each action requiring coordination and usually physical contact with the beverage container during the filling process. Moreover, top-filling beverage dispensing systems often take a large amount of space on a counter or serving area and require attention to operate and control.

Disclosed herein are beverage dispensing systems and methods thereof that address the foregoing problems with top-filling beverage dispensing systems and methods.

SUMMARY

Disclosed herein is a beverage dispensing system including, in some embodiments, a housing including a dispensing platform, one or more valves at least partially below the dispensing platform, one or more valve-controlling modules respectively disposed in one or more cutouts of the housing, and an embedded system including the one or more valve-controlling modules and a central module communicatively coupled to the one or more valve-controlling modules. Each valve includes a beverage-container coupler extending from the valve through a corresponding opening in the dispensing platform configured to couple with bottom-fillable beverage containers for use with the beverage dispensing system. Each valve-controlling module includes a user-facing touchpad for a user interface having one or more buttons configured to control a corresponding valve of the one or more valves. The embedded system is configured for beverage dispensation as well as analytics, communications, payment processing, or a combination thereof related to beverage dispensation.

In some embodiments, each valve-controlling module of the one or more valve-controlling modules includes an encased printed circuit board assembly with surface-mounted components. The surface-mounted components are selected from a microcontroller with at least a valve-controlling program stored in a memory thereof, a solenoid connector configured for connecting and controlling a solenoid of a valve-actuating assembly, one or more sensor connectors configured for respectively connecting and controlling one or more sensors, one or more data ports configured for sending at least sensor data from the valve-controlling module, and one or more power connectors.

In some embodiments, the central module includes a printed circuit board assembly with surface-mounted components. The surface-mounted components are selected from a microcontroller with one or more programs related to beverage dispensation stored in a memory thereof, one or more networking interfaces configured for external networking, one or more communication interfaces configured for direct operation of the beverage dispensing system, one or more data ports configured for receiving at least sensor data from one or more valve-controlling modules, non-volatile memory or a connector configured for removable non-volatile memory, and one or more power connectors.

In some embodiments, the one or more networking interfaces include one or more wired networking interfaces, one or more wireless networking interfaces, or a combination thereof. The one or more wired networking interfaces include an ethernet port and an associated microchip. The one or more wireless networking interfaces include one or more transmitter-receivers or transceivers and at least one associated microchip configured for Wi-Fi, Bluetooth®, near-field communication ("NFC"), or a combination thereof.

In some embodiments, at least one networking interface of the one or more networking interfaces is configured to communicate with one or more point-of-sale service providers. One or more valve-actuating assemblies are configured to remain locked until payment for one or more beverages is successfully processed by way of the one or more point-of-sale providers, consumer age is verified by way of an identity or age verification service provider or a radio frequency identification ("RFID") tag, consumer location is verified by way of a consumer-associated mobile device, or a combination thereof.

In some embodiments, at least one networking interface of the one or more networking interfaces is configured to communicate with a backend system including a web server, an application server, a database server, and a database. The backend server is configured to serve a mobile web application to one or more users of the beverage dispensing system including owners, lessees, consumers, or a combination thereof for interacting with the beverage dispensing system.

In some embodiments, the beverage dispensing system further includes one or more remote controls. At least one communication interface of the one or more communication interfaces is configured to communicate with a handheld remote control configured to enable one or more users of the beverage dispensing system including owners or lessees to interact with the beverage dispensing system.

In some embodiments, the central module includes a Global Positioning System ("GPS") receiver including a GPS antenna and a GPS processor configured to determine a global position of the beverage dispensing system.

In some embodiments, the central module includes a statistics module configured for statistical analyses of sensor data from one or more sensors provided by way of the one or more valve-controlling modules. The one or more sensors are selected from at least a beverage flow meter, a beverage temperature sensor, and one or more environmental sensors.

In some embodiments, the central module includes an analytics module configured to determine patterns from at least the statistical analyses of the sensor data, time of day from a real-time clock of the central module, payment processing data, or a combination thereof.

In some embodiments, the beverage dispensing system further includes a clear object detector associated with each valve of the one or more valves. Each clear object detector is configured for detecting clarity in a beverage line leading its respective valve.

In some embodiments, the beverage dispensing system further includes a beverage container position sensor associated with each valve of the one or more valves. Each beverage container position sensor is configured for detecting beverage container position on the beverage-container coupler of its respective valve before any beverage dispensation.

Disclosed herein is a self-service beverage client-server system including, in some embodiments, a mobile web application for a mobile device, one or more programs of an embedded system of a beverage dispensing system, and an application stack of at least one server host of a backend system. The mobile web application is configured to run at least in part from a primary memory of a mobile device and present a self-service graphical user interface ("GUI") within a mobile web browser on a touchscreen of the mobile device. The self-service GUI includes a plurality of consumer-selectable self-service beverage options selected from at least beverage type, beverage brand, amount of beverage, and beverage cost. The self-service GUI further includes one or more payment processing options connected with the self-service beverage options. The one or more programs of the embedded system are configured to run at least in part from a primary memory of a central module of the embedded system and a primary memory of a valve-controlling module of the embedded system. The one or more programs of the embedded system include at least a payment processing program of the central module and valve-controlling program of the valve-controlling module. The application stack is configured to run at least in part from a primary memory of the at least one server host of the backend system. The application stack includes a web server, an application server configured to serve the mobile web application, a database server, and a database.

In some embodiments, the central module includes a printed circuit board assembly with surface-mounted components. The surface-mounted components are selected from a microcontroller with at least the payment processing program stored in a secondary memory thereof, one or more networking interfaces configured for external networking, and one or more power connectors.

In some embodiments, the one or more networking interfaces include one or more wired networking interfaces, one or more wireless networking interfaces, or a combination thereof. The one or more wired networking interfaces include an ethernet port and an associated microchip. The one or more wireless networking interfaces include one or more transmitter-receivers or transceivers and at least one associated microchip configured for Wi-Fi, Bluetooth®, NFC, or a combination thereof.

In some embodiments, at least one networking interface of the one or more networking interfaces is configured to communicate with one or more point-of-sale service providers, one or more identity or age verification service providers, or both. One or more valve-actuating assemblies respectively corresponding to one or more valves of the beverage dispensing system are configured to remain locked until payment for one or more beverages is successfully processed by way of the one or more point-of-sale providers, consumer age is verified by way of an identity or age verification service provider or an RFID tag, consumer location is verified by way of a consumer-associated mobile device, or a combination thereof.

In some embodiments, the central module includes a GPS receiver including a GPS antenna and a GPS processor configured to determine a global position of the beverage dispensing system for comparison with a global position of a consumer by way of a consumer-associated mobile device for location verification.

Disclosed herein is a self-service beverage method including, in some embodiments, instantiating a mobile web application in a primary memory of a mobile device; instantiating a payment processing program in a primary memory of a central module of an embedded system of a beverage dispensing system; instantiating a valve-controlling program in a primary memory of a valve-controlling module of the embedded system of the beverage dispensing system; and instantiating an application stack at least in part in a primary memory of at least one server host of a backend system. Upon instantiating the mobile web application in a primary memory of a mobile device, the mobile web application is configured to present a self-service GUI within a mobile web browser on a touchscreen of the mobile device. The self-service GUI includes a plurality of consumer-selectable self-service beverage options selected from at least beverage type, beverage brand, amount of beverage, and beverage cost. The self-service GUI further includes one or more payment processing options connected with the self-service beverage options.

In some embodiments, the self-service beverage method further includes communicating with one or more point-of-sale service providers with at least one networking interface of one or more networking interfaces of the central module. A valve-actuating assembly of a valve of the beverage dispensing system is kept locked with the valve-controlling program until payment for one or more beverages is successfully processed by the payment-processing program through the one or more point-of-sale providers.

In some embodiments, the self-service beverage method further includes keeping a valve-actuating assembly of a valve of the beverage dispensing system locked with the valve-controlling program until consumer age is successfully verified for one or more adult beverages. Consumer age is verified by communicating with one or more identity or age verification service providers with at least one networking interface of one or more networking interfaces of the central module. Alternatively, consumer age is verified by reading a consumer-worn RFID tag with an RFID tag reader of the central module.

In some embodiments, the self-service beverage method further includes determining a global position of the beverage dispensing system, determining a global position of a consumer, and keeping a valve-actuating assembly of a valve of the beverage dispensing system locked with the valve-controlling program until the global position of the consumer and the global position of the beverage dispensing system are verified as the same global position. Determining a global position of the beverage dispensing system includes determining the global position with a GPS receiver of the central module including a GPS antenna and a GPS processor. Determining a global position of a consumer includes determining the global position by way of a location shared by a consumer-associated mobile device with the beverage dispensing system through the mobile web application.

In some embodiments, the self-service beverage method further includes determining a number of ounces poured for any one or more beverages per beverage container, consumer, or unit of time using data from one or more beverage flow meters respectively corresponding to one or more valves of the beverage dispensing system, the payment processing program, a real-time clock of the central module of the beverage dispensing system, or a combination thereof.

In some embodiments, the self-service beverage method further includes alerting an owner or lessee of the beverage dispensing system through the mobile web application of an empty keg using data from an empty keg detector of the beverage dispensing system.

In some embodiments, the self-service beverage method further includes determining a temperature for any one or more beverages using data from one or more beverage temperature sensors, the payment processing program, a real-time clock of the central module of the beverage dispensing system, or a combination thereof.

In some embodiments, the self-service beverage method further includes determining a time of day each beverage was served using data from the payment processing program and a real-time clock of the central module of the beverage dispensing system.

In some embodiments, the self-service beverage method further includes alerting the owner or lessee when one or more beverage lines of the beverage dispensing system need to be cleaned using data from one or more clear object detectors respectively corresponding to the one or more valves of the beverage dispensing system.

DRAWINGS

Figure 17:
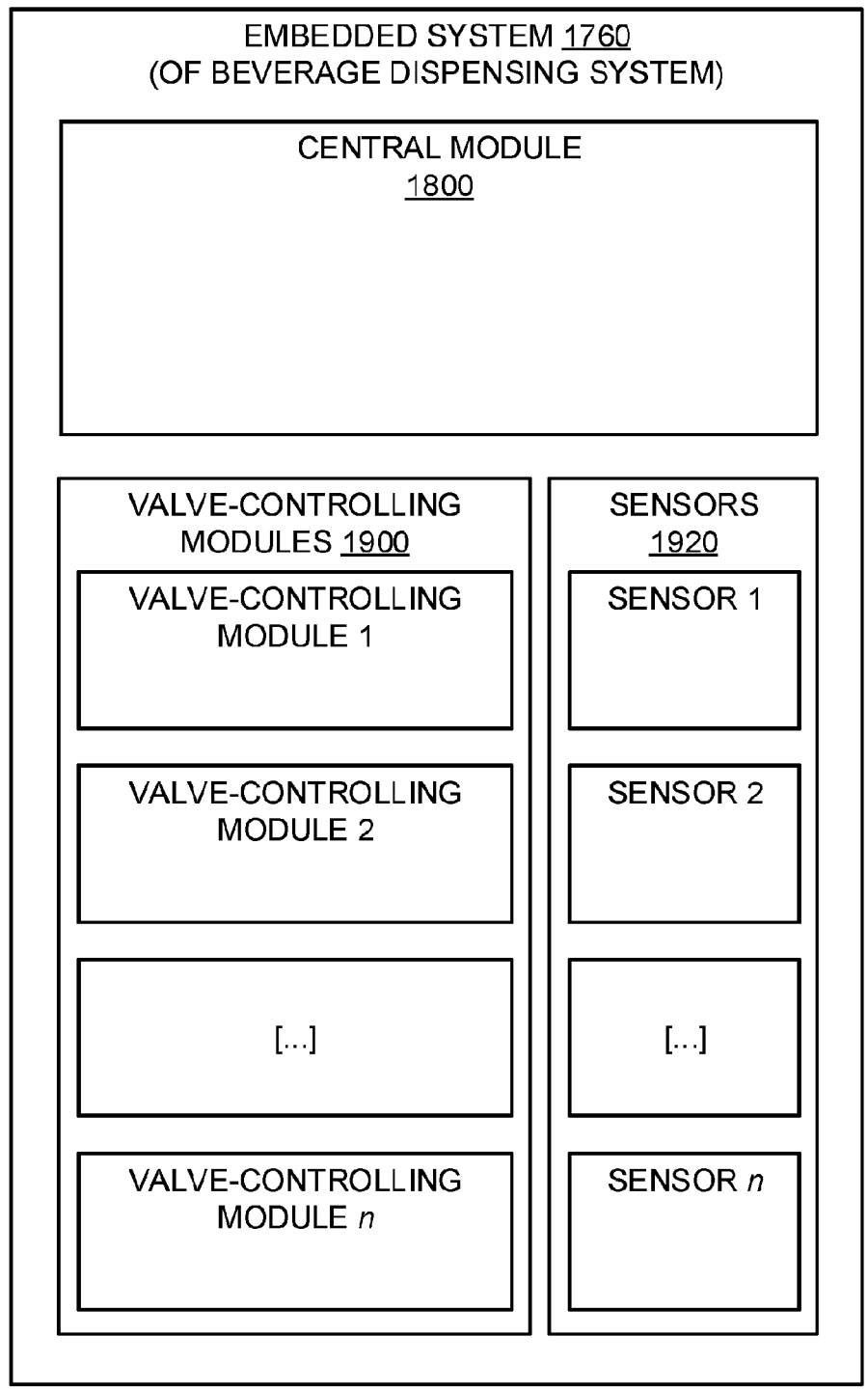

FIG. 17 provides a schematic illustrating an embedded system of a beverage dispensing system in accordance with some embodiments.

Figure 18:
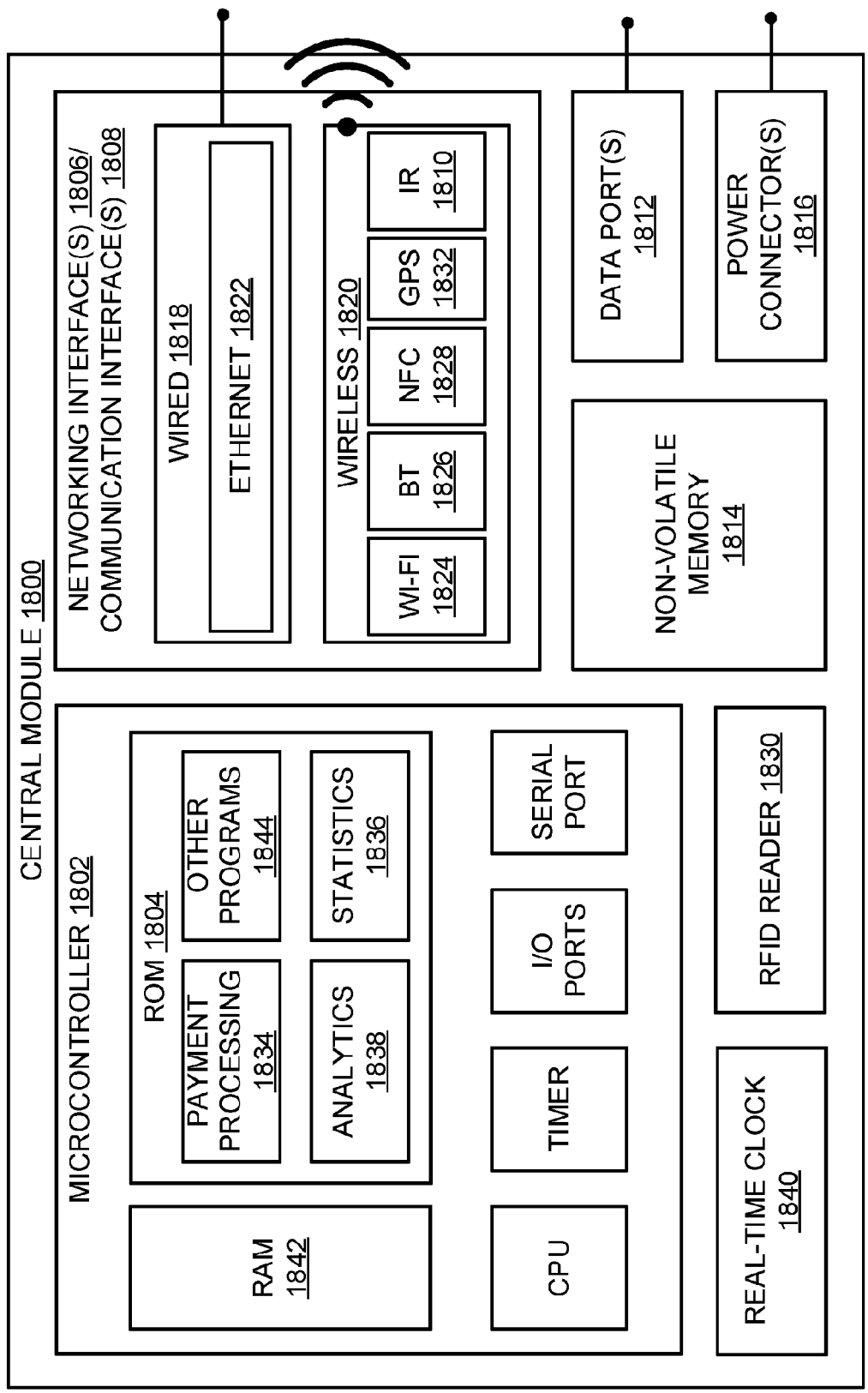

FIG. 18 provides a schematic illustrating a central module of an embedded system of a beverage dispensing system in accordance with some embodiments.

Figure 19:
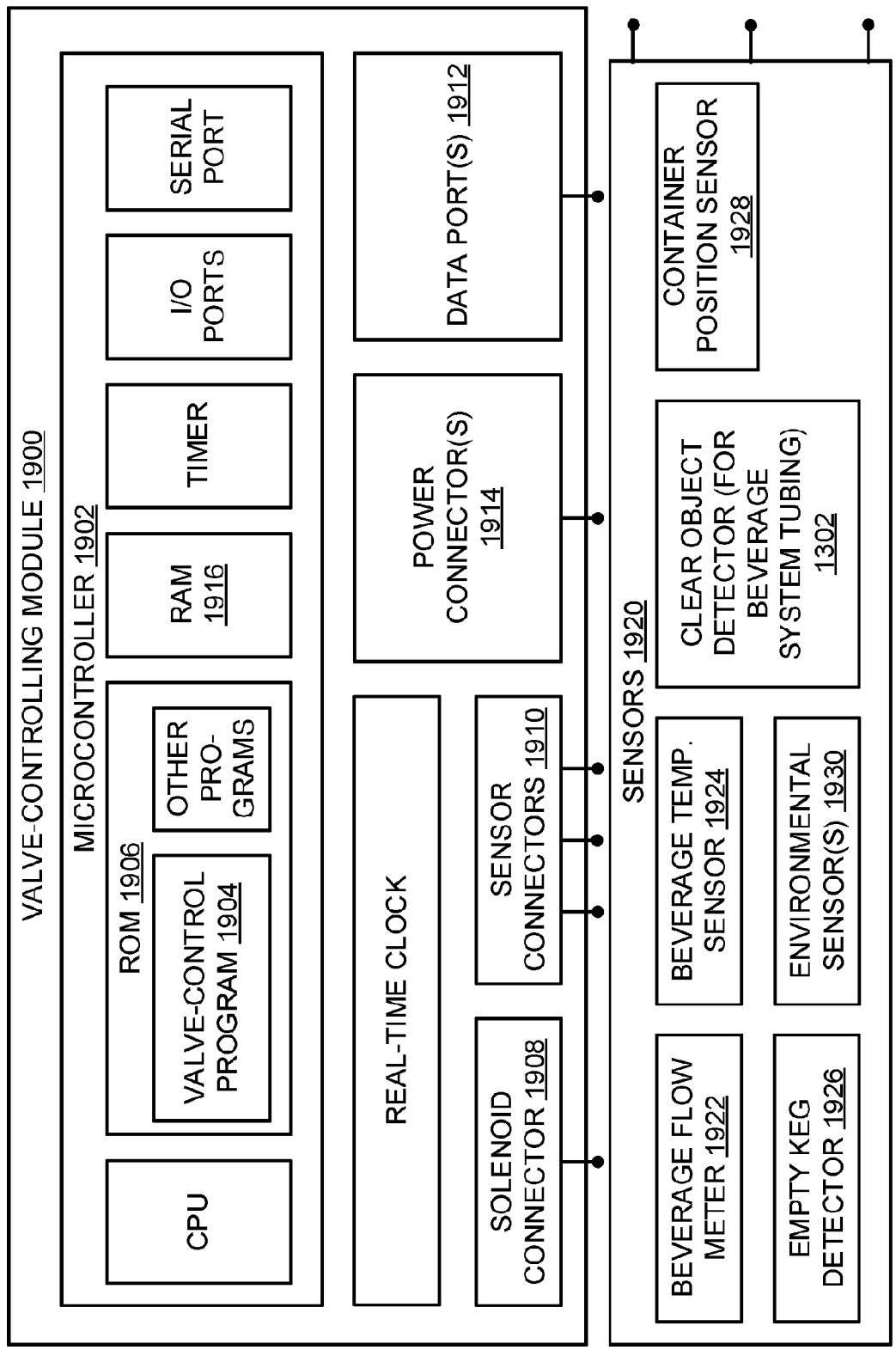

FIG. 19 provides a schematic illustrating a valve-controlling module of an embedded system of a beverage dispensing system in accordance with some embodiments.

Figure 20:
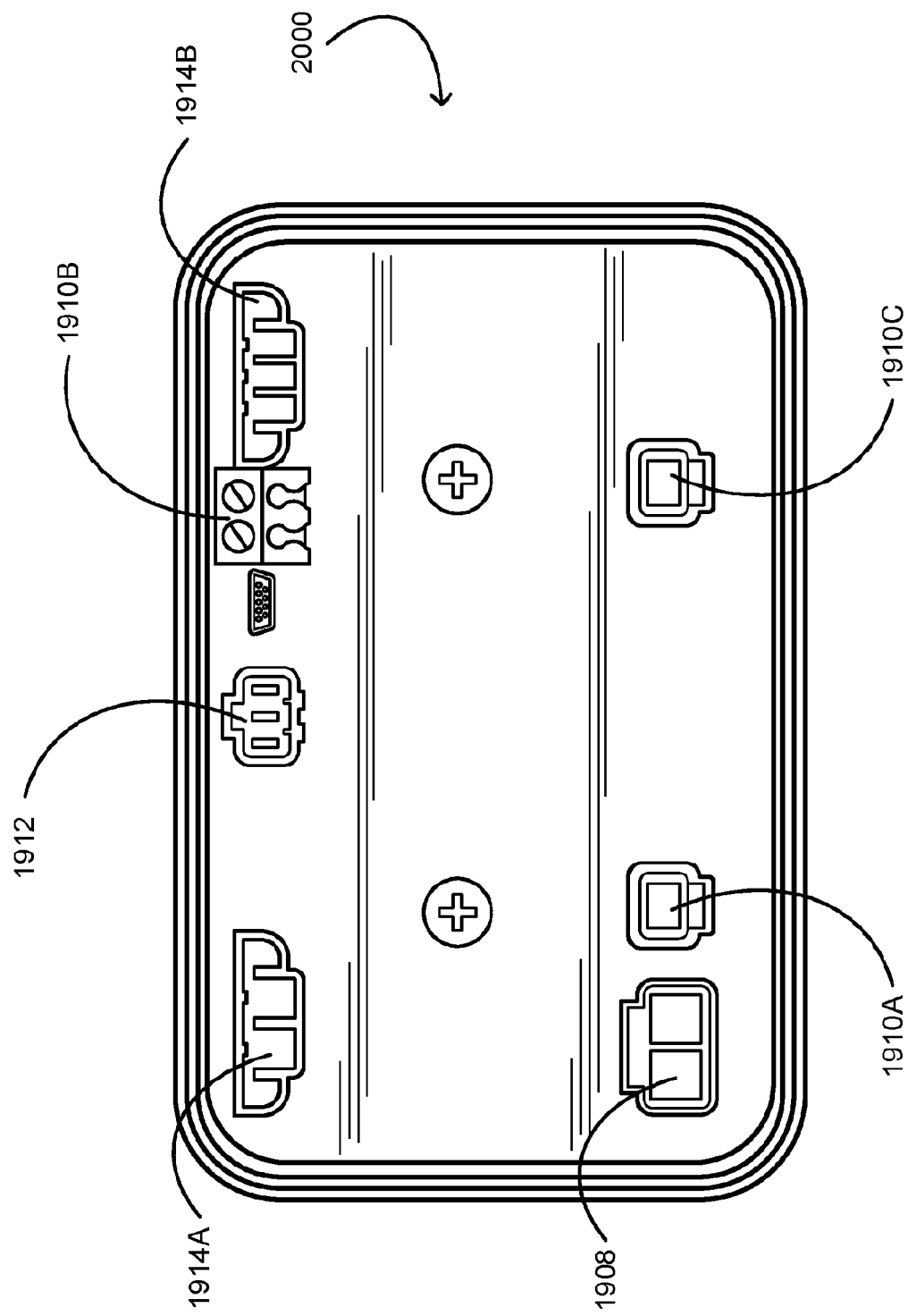

FIG. 20 illustrates a close-up view of a face of a valve-controlling module for making various connections within a beverage dispensing system in accordance with some embodiments.

Figure 21:
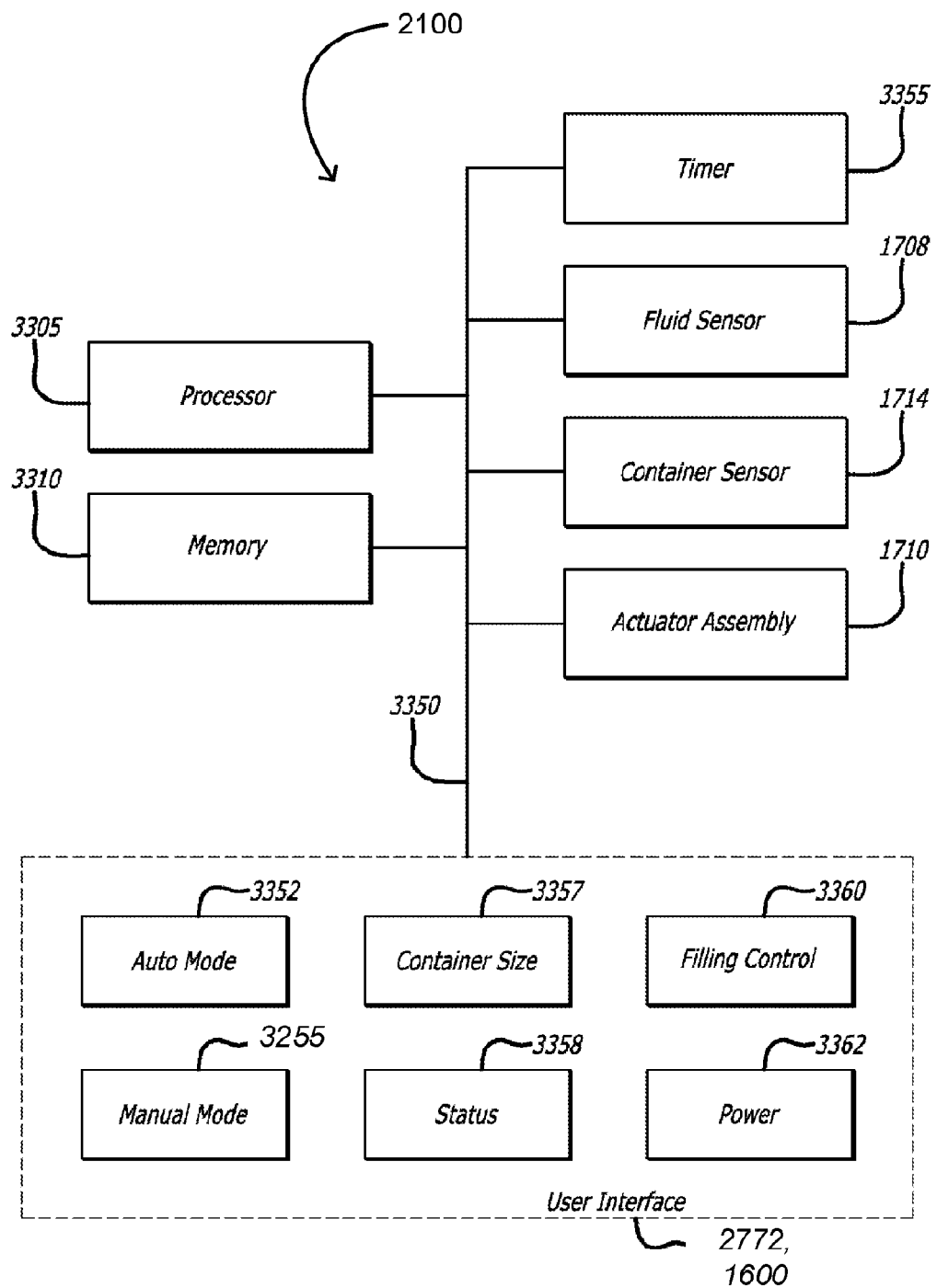

FIG. 21 illustrates a dispensing logic diagram of an embedded system for beverage dispensation in accordance with some embodiments.

Figure 22:
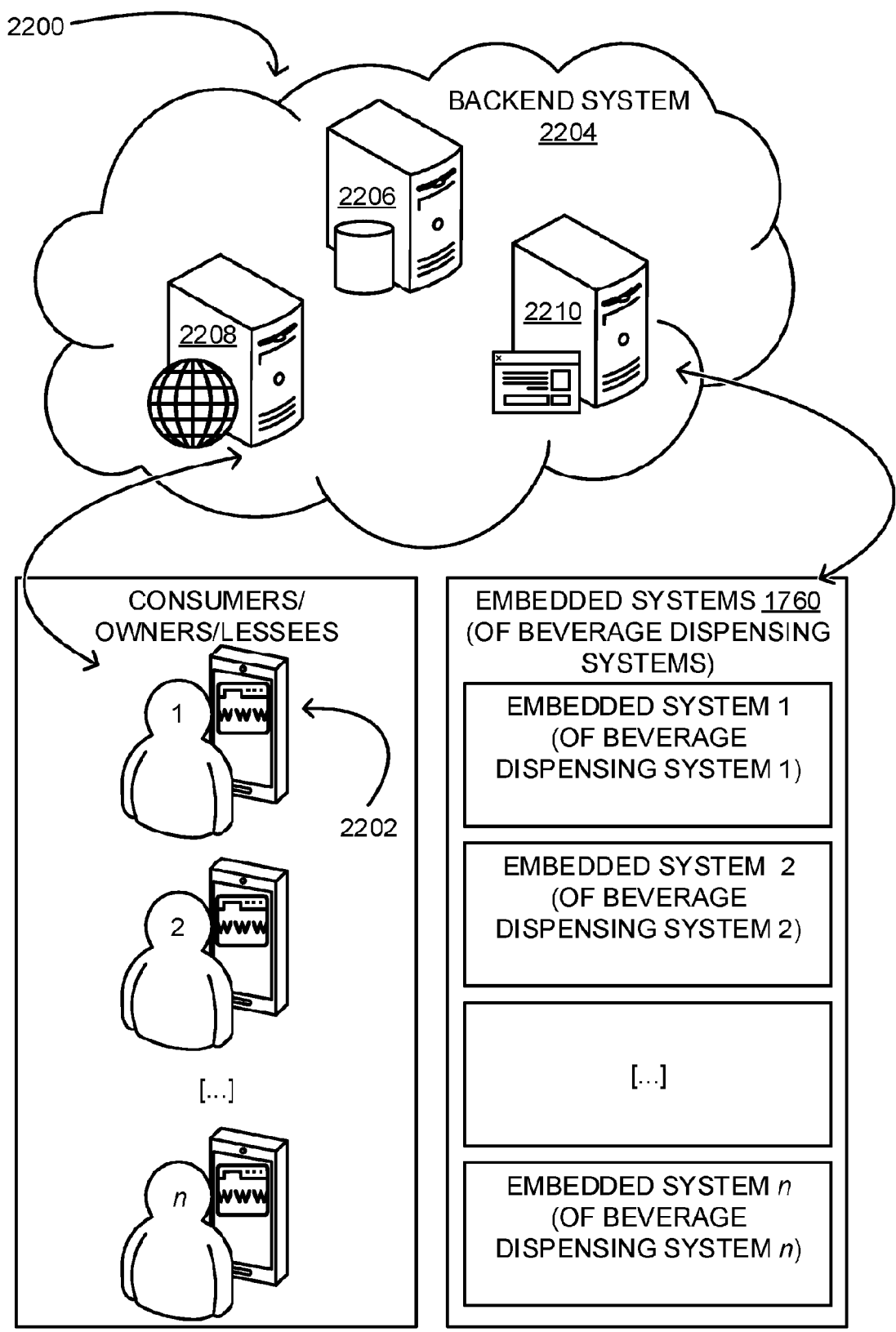

FIG. 22 illustrates a self-service beverage client-server system for beverage dispensation in accordance with some embodiments.

Figure 23:
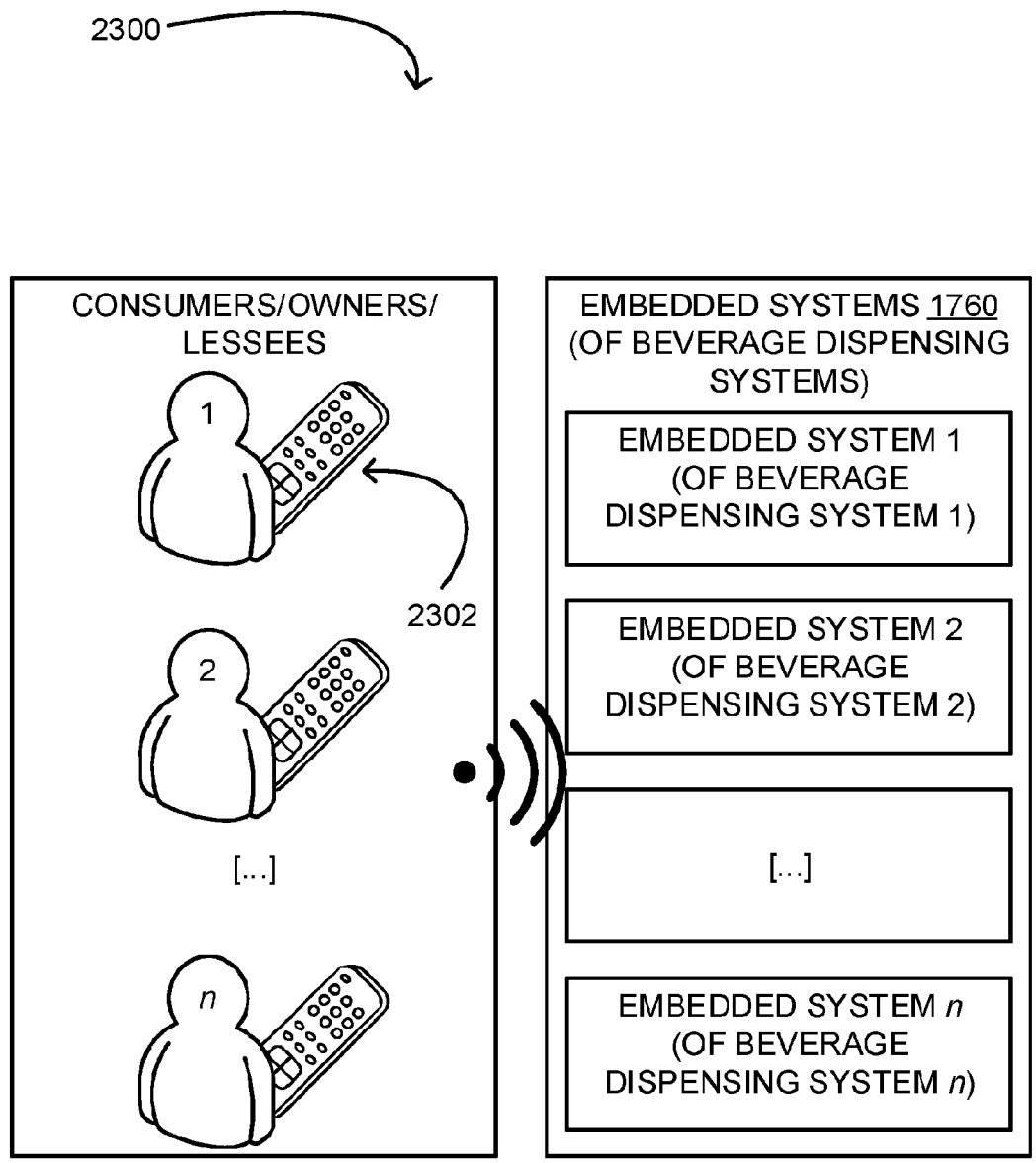

FIG. 23 illustrates an embedded system of a beverage dispensing system remotely operable by a handheld remote control in accordance with some embodiments.

Figure 24:
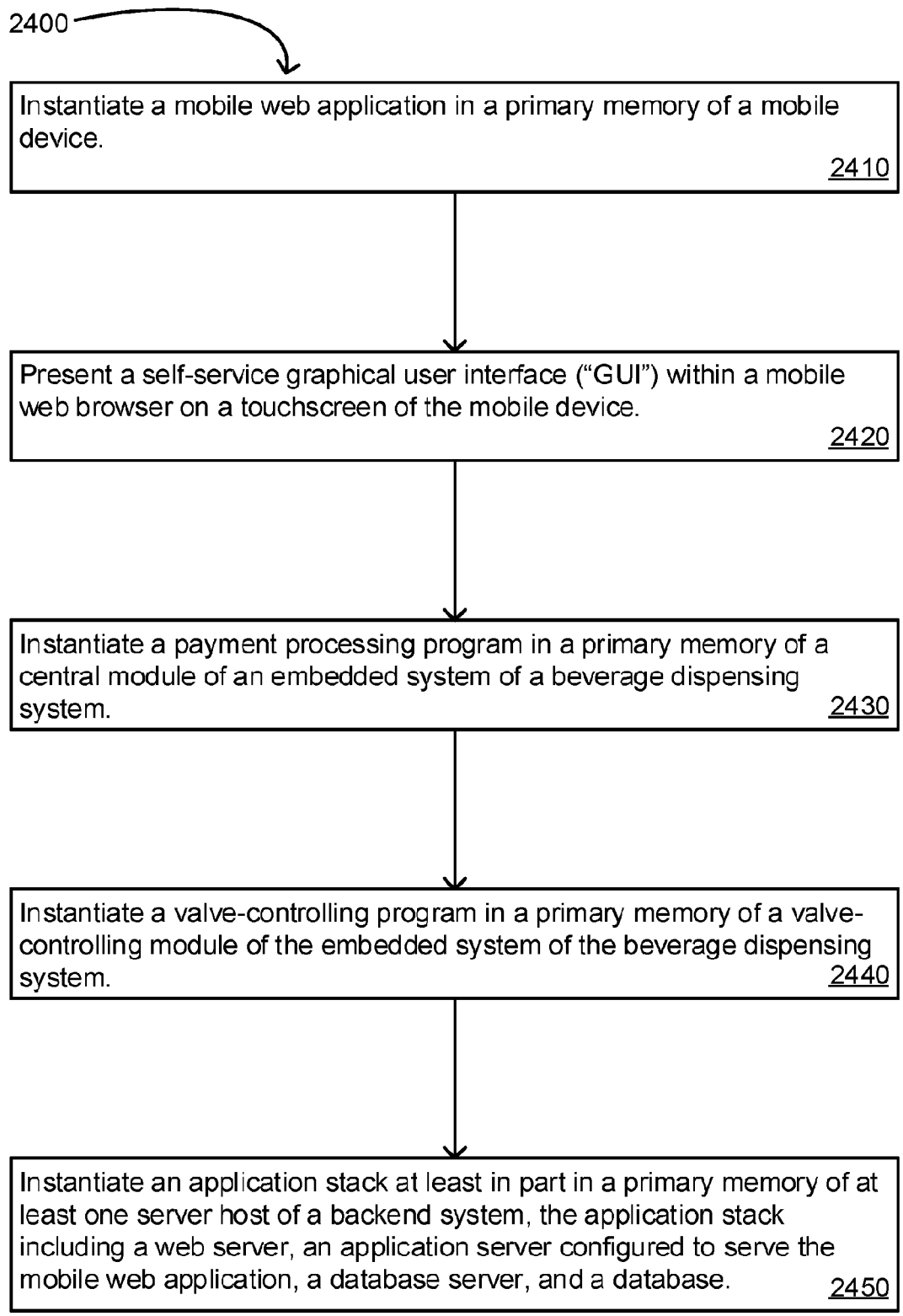

FIG. 24 illustrates a self-service beverage method in accordance with some embodiments.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

International Patent Application No. PCT/US12/72155, filed on Dec. 28, 2010, and published as WO 2013/102130 on Jul. 4, 2013, is hereby incorporated herein by reference in its entirety.

Beverage Dispensing System

Figure 1:
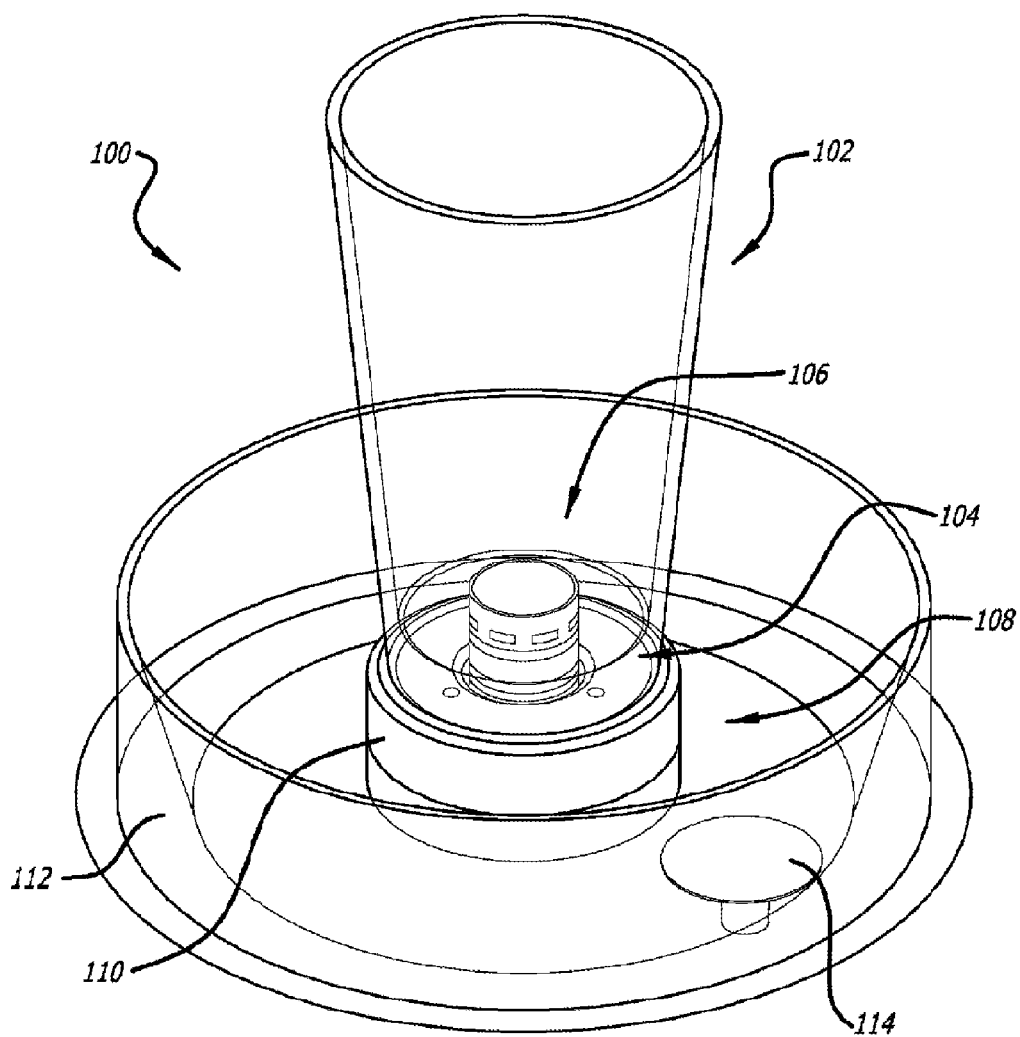
FIG. 1 illustrates a beverage container connected to a beverage dispensing assembly of a beverage dispensing system for filling the beverage container through its bottom in accordance with some embodiments.

FIG. 1 illustrates a beverage container 102 connected to a beverage dispensing assembly 100 of a beverage dispensing system for filling the beverage container 102 through its bottom in accordance with some embodiments.

Referring to FIG. 1, the beverage dispensing assembly 100 is illustrated with the beverage container 102 coupled and ready to be filled. The beverage dispensing assembly 100 can be used to dispense beverages in a beverage dispensing system (see, for example, the beverage dispensing system of FIG. 11) including carbonated beverages such as soda, beer, etc. The beverage container 102 can be any container for receiving the beverage including, for example, a pint glass, mug, disposable glass, or pitcher. The beverage container 102 can couple to the beverage dispensing assembly 100 at or near the bottom 104 of the beverage container 102. Therefore, the beverage container 102 is filled below a surface of the beverage during the beverage dispensing process.

In some embodiments, the beverage container 102 includes a container connection device 106 that is designed to couple to a dispenser connection device 108. The beverage dispensing assembly 100 can be coupled to a beverage source such as a keg or carbonation and soda lines. The container connection device 106 can include a valve that opens when coupled to the dispenser connection device 108 and permits beverage flow therethrough. The container connection device 106 can then close when the beverage container 102 is removed from the beverage dispensing assembly 100, thereby preventing leaks from the beverage container 102. Alternatively, the container connection device 106 is a mating plate of the beverage container 106 as described herein below, which mating plate is configured to be displaced by the dispenser connection device 108 when the dispenser connection device 108 is a complementary mating plate. The beverage dispensing assembly 100 includes a housing 110 shaped to properly align the container connection device 106 with the dispenser connection device 108. The beverage dispensing assembly 100 can also include a basin 112 to catch any potential spilled beverage. The basin 112 can include various shapes, such as a bowl, raised lip, or recessed area. The basin 112 can include a drain 114 for easy disposal of caught beverage.

During use, the beverage container 102 is coupled to the beverage dispensing assembly 100. When the attachment is made, the container connection device 106 and the dispenser connection device 108 engage to create a beverage flow path between the beverage container 102 and a beverage source, such that the beverage container 102 is filled from a bottom portion thereof. A user can overflow the beverage container to remove any extra foam that can be created at the top of the beverage container during the filling process. Alternatively, some beverage can spill during the removal or filling process. The basin 112 is designed to catch the overflow beverage, which can be removed through drain 114 to facilitate cleaning. When the beverage container 102 is removed from the beverage dispensing assembly 100, the container connection device 106 can be disengaged from the dispenser connection device 108 to seal the beverage container 102 from leaking.

In some embodiments, the beverage dispensing assembly 100 can be a separate device removed from the beverage source but coupled by a hose or tube or other beverage transporting device. The beverage dispensing assembly 100 can be incorporated into, or coupled to, an immobile surface such as a countertop, or the beverage dispensing assembly 100 can be incorporated into an independently movable platform to be arranged at the convenience of the user. The beverage dispensing assembly 100 can also be in various shapes, and include additional features, such as the housing 110, basin 112, or drain 114. The beverage dispensing assembly 100 can alternatively include audio or visual devices. For example, the beverage dispensing assembly 100 can include information, logos, or designs identifying the contents associated with the beverage dispensing assembly 100. In some embodiments, the beverage dispensing assembly 100 can include lights that can be colored, or can flash, or speakers that turn on when a beverage container 102 is connected to the beverage dispensing assembly 100.

Figure 2:
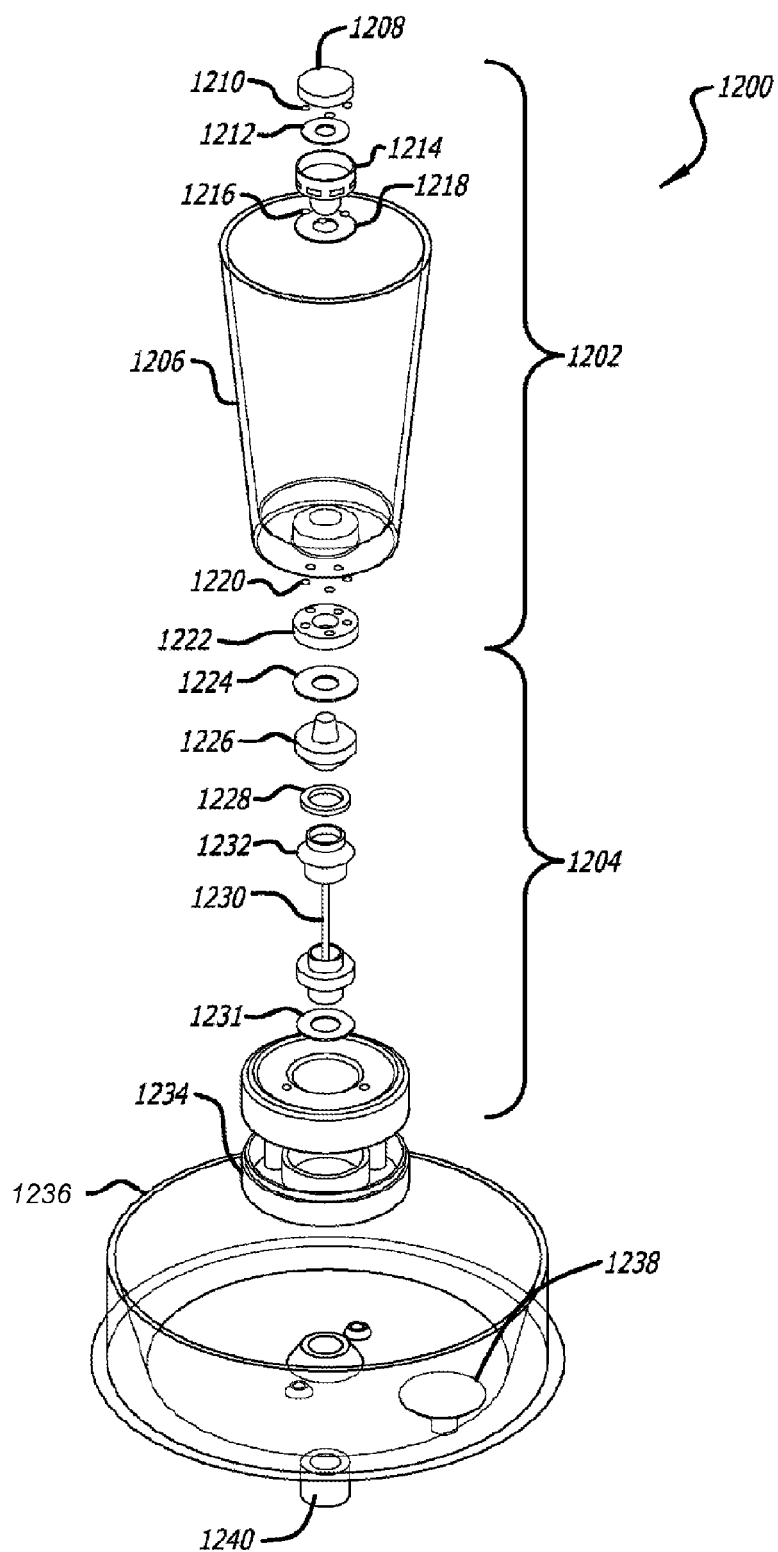
FIG. 2 illustrates an exploded view of a beverage dispensing assembly including a dispenser connection device connected to a container connection device of a beverage container in accordance with some embodiments.

FIG. 2 illustrates an exploded view of a beverage dispensing assembly 1200 including a dispenser connection device 1204 connected to a container connection device 1202 of a beverage container 1206 in accordance with some embodiments.

In some embodiments, the beverage container 1206 includes the container connection device 1202. The container connection device 1202 includes a cap 1208, cap housing magnets 1210, seal 1212, rim 1214, rim housing magnets 1216, seal 1218, bottom section 1222, and bottom housing magnets 1220. The magnets 1210, 1216, 1220 can be one or more magnetic pieces that fit within various indentions of the container connection device, solid magnetic rings, or material incorporated into the respective components of the container connection device. Seals 1212, 1218 can be any sealing device, such as an O-ring or rubber gasket.

In some embodiments, cap housing magnets 1210 comprise five neodymium magnets 1210 equally spaced around a circumference of the cap 1208 and held in place by seal 1212. Seal 1212 can be a rubber gasket generally disc-shaped to create a seal at the cap in a closed position. Rim 1214 includes apertures to permit beverage flow when the cap is in an open position, and includes rim housing magnets 1216, comprising five neodymium magnets corresponding to the five cap housing magnets, together operating to bias the cap 1208 in a closed position. Seal 1218 seals the rim 1214 to the beverage container 1206. The bottom section 1222 couples to the rim 1214 and can include neodymium magnets 1220 to attract the dispenser connection device 1204.

As shown in FIG. 2, the beverage dispensing assembly 1200 can include the dispenser connection device 1204, including a first seal 1224 for a filler valve 1226, a filler valve magnet 1228, a nozzle 1230, a collar 1232 between the filler valve 1226 and nozzle 1230, and a second seal 1231. The first and second seals 1224 and 1231 can be an O-ring, gasket, or other device to create a fluid tight seal between the dispenser connection device 1204 and the container connection device 1202.

In some embodiments, nozzle 1230 can be a shaft that enters through the container connection device 1202 to push against cap 1208 and create a beverage flow pathway between the beverage dispensing assembly 1200 and the beverage container 1206. The nozzle can include one or more apertures to permit beverage flow therethrough. The filler valve 1226 can move along a longitudinal axis of the nozzle 1230 to open and close the beverage flow path through the nozzle. The filler valve 1226 can be contoured, including a rim to mate with the bottom section 1222 of the container connection device 1202. This connection permits the dispenser connection device 1204 and container connection device 1202 to move together during the coupling/decoupling to reduce leaks. Magnet 1228 can be a neodymium magnetic ring coupled to the filler valve 1226, which is designed to attract magnets 1220 of the bottom section 1222 of the container connection device 1202, and further ensures that the container connection device 1202 moves with the dispenser connection device 1204 during use. The magnetic attraction can further stabilize beverage container 1206 during the filling process. The collar 1232 couples the filler valve 1226 to the nozzle 1230, permitting the filler valve 1226 to translate along the nozzle while remaining coupled to the nozzle during use. The collar 1232 can be formed from a flexible rubber material that is shaped to easily compress, but which expands back to its pre-compressed shape to provide a bias for the filler valve 1226 to close nozzle 1230. The collar 1232 can further provide protection against leaks during use.

Alternatively, the container connection device 1202 is a mating plate of the beverage container 1206 as described herein below, which mating plate is configured to be displaced by the dispenser connection device 1204 when the dispenser connection device 1204 is a complementary mating plate. In such an embodiment, the nozzle 1230 is generally in a closed position and includes the complementary mating plate. With the mating plate raised, the one or more apertures of the nozzle 1230 are closed. When a beverage container is coupled to the nozzle 1230, the complementary mating plate is pushed down along the nozzle 1230, opening the one or more apertures and creating a beverage flow path between the beverage dispensing assembly and the beverage container.

In some embodiments, the beverage dispensing assembly 1200 can further include other features such as a basin, drain, lights, etc. For example, the beverage dispensing assembly 1200 can include a housing 1234 for switches, lights, or other features. The housing can be used as an advertising or identification space, such as to identify the type or brand of beverage coupled to the beverage dispensing assembly 1200. Housing 1234 can include light-emitting diode ("LED") lights that illuminate the beverage during the filling process. Pressure switches can be incorporated in the housing to trigger the LED lights or can be used to activate the filling process when a beverage container is detected on the housing. The LED lights can alternatively or also be housed around the basin or other parts of the beverage dispensing assembly 1200. The beverage dispensing assembly 1200 can also include a basin 1236 to catch any overflow during the filling process. The basin 1236 can be used to intentionally overflow a foaming beverage in order to remove excess foam from the top thereof. The basin 1236 can include a drain 1238 to permit easy clean up after use. A conduit 1240 can be coupled to both a beverage source and the beverage dispensing assembly 1200. An intervening manifold permits attachment of the beverage dispensing assembly 1200 to multiple beverage sources, thereby permitting the beverage dispensing assembly 1200 to be used for multiple beverages. In such an embodiment, the desired beverage can be chosen by the user by way of a switch or rotation of a manifold selection member.

Figure 3:
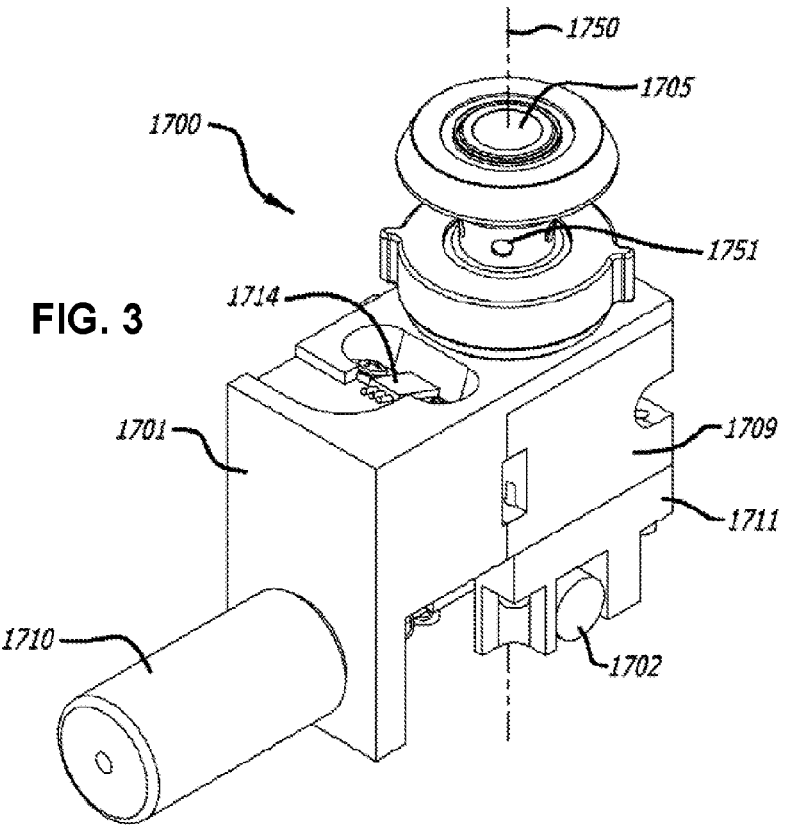
FIG. 3 illustrates a front, top, right perspective view of a valve of a beverage dispensing system in accordance with some embodiments.

FIG. 3 illustrates a front, top, right perspective view of a valve 1700 of a beverage dispensing system in accordance with some embodiments.

Valve 1700 can include a housing body 1701, valve block 1709, and lower block 1711. Slide rod 1702 is coupled to the lower block 1711 and positioned within a recessed area of the lower block 1701. The recessed area is shaped to receive the slide rod 1702. The valve 1700 can also include a nozzle 1705 to couple the valve 1700 to a beverage container (not shown), a valve actuator assembly 1710 to transition the valve 1700 from a close position to an open position, and a fitting 1721 to couple the valve 1700 to a beverage source (not shown). A first set of one or more apertures 1751 of the valve 1700 serves as back pressure relief holes/vent holes. These vent holes allow the back pressure to be released from the filler if the cup is removed prematurely from the nozzle, as well as permit leftover beverage to drain while the coupler is in the close position. The beverage can flow from the valve 1700 to the beverage container by way of a second set of apertures in the nozzle 1705 revealed upon pushing the coupler 2105 (see FIG. 7) toward the first set of one or more apertures 1751. For referencing purposes, axis 1750 is illustrated and positioned through the valve 1700 and a center of the nozzle 1705 connecting longitudinally the nozzle 1705 with the housing body 1701, the valve block 1709 and the lower block 1711.

Figure 4:
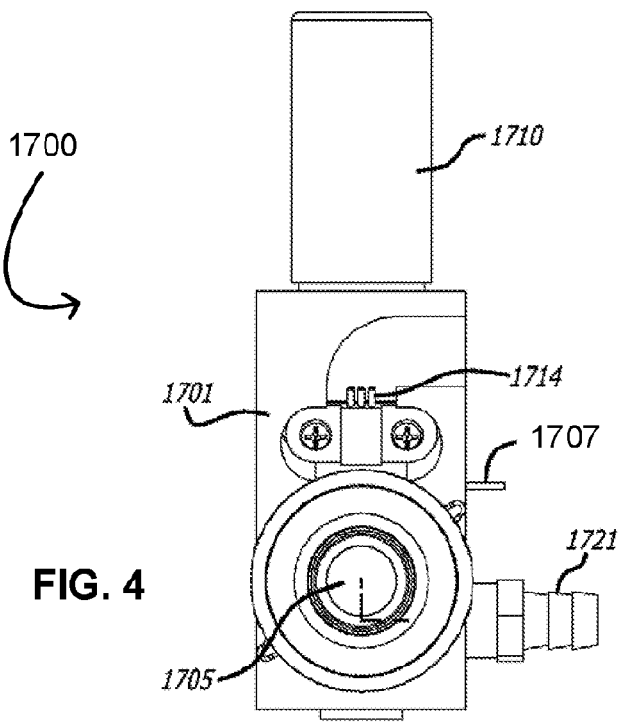
FIG. 4 illustrates a top plan view of a valve of a beverage dispensing system in accordance with some embodiments.

FIG. 4 illustrates a top plan view of the valve 1700 of a beverage dispensing system in accordance with some embodiments.

In this view, the fitting 1721 is off to the right of the axis 1750. The valve 1700 can include one or more sensors such as, for example, beverage container sensor 1714 to detect the presence of the beverage container and fluid sensor 1707 to keep track of the beverage flowing through the valve 1700. In some embodiments, the valve 1700 can be used with a processor (not shown) to control the electrical and/or mechanical dispensing logic associated with dispensing the beverage into the beverage container. In some embodiments, the valve 1700 can be configured to rotate the incoming beverage from the beverage source. The fluid sensor 1707 can then sense the rotational speed of the beverage, which is used by the processor to determine the amount of beverage to dispense into the beverage container.

Figure 5:
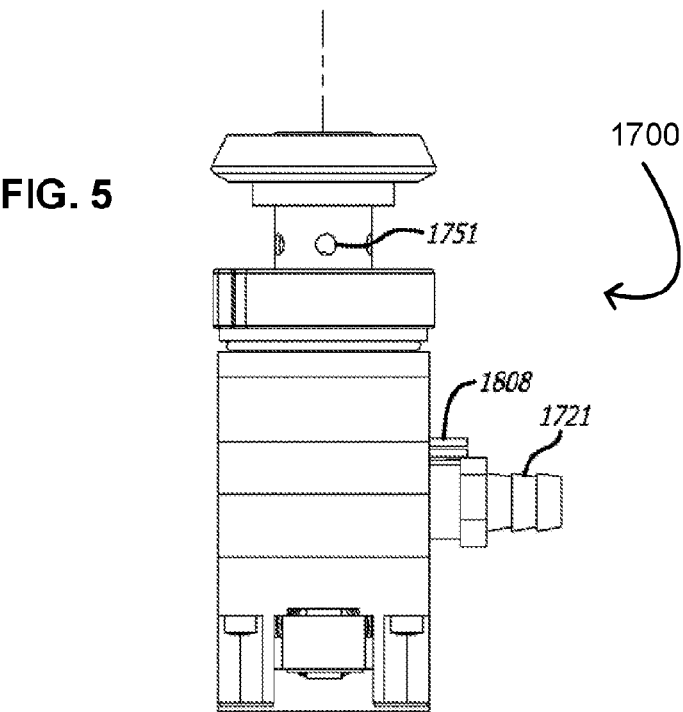
FIG. 5 illustrates a rear elevation of a valve of a beverage dispensing system in accordance with some embodiments.

FIG. 5 illustrates a rear elevation of the valve 1700 in accordance with some embodiments. In this view, the fitting 1721 can be seen on the right of the axis 1750.

Figure 6:
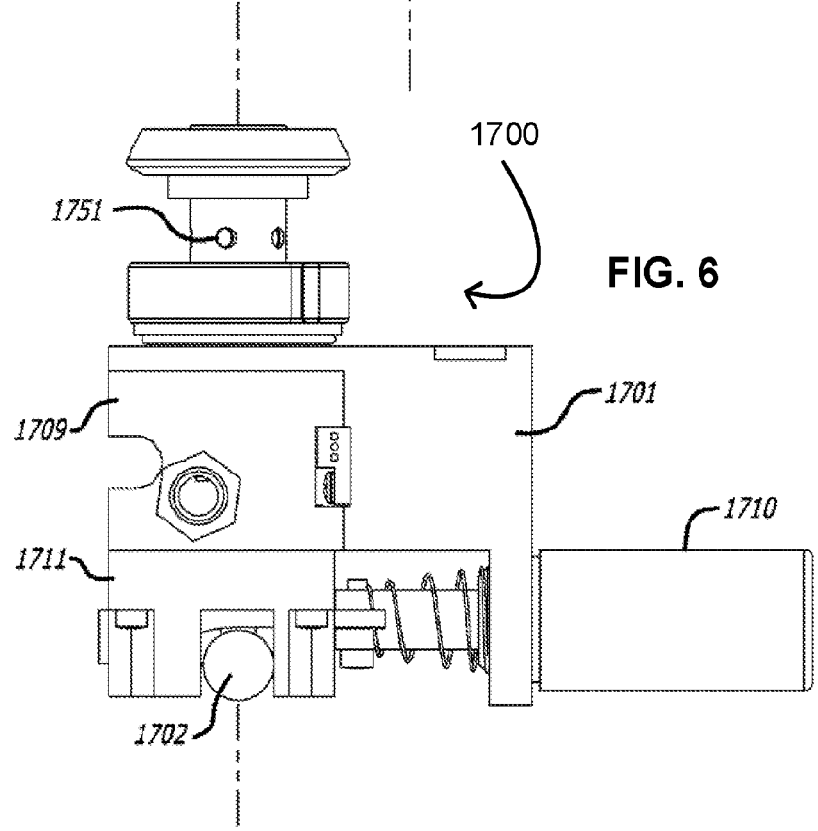
FIG. 6 illustrates a left side elevation of a valve of a beverage dispensing system in accordance with some embodiments.

FIG. 6 illustrates a left side elevation of the valve 1700 in accordance with some embodiments.

In this view, the valve actuator assembly 1710 can be seen on the right of the axis 1750. The beverage can flow from the beverage source through the fitting 1721 into the valve 1700. In some embodiments, the fitting 1721 is offset from the axis 1750. This can cause the beverage to spin within the valve block 1709. The rotating beverage permits the valve 1700 to track the beverage flow using the fluid sensor 1707. Based on the number of rotations within an amount of time (angular speed of the beverage), the processor can calculate the volume of beverage dispensed by the valve 1700. Based on the volume of the beverage dispensed, the processor can close the valve 1700 when the coupled beverage container is filled to a desired level.

Figure 7:
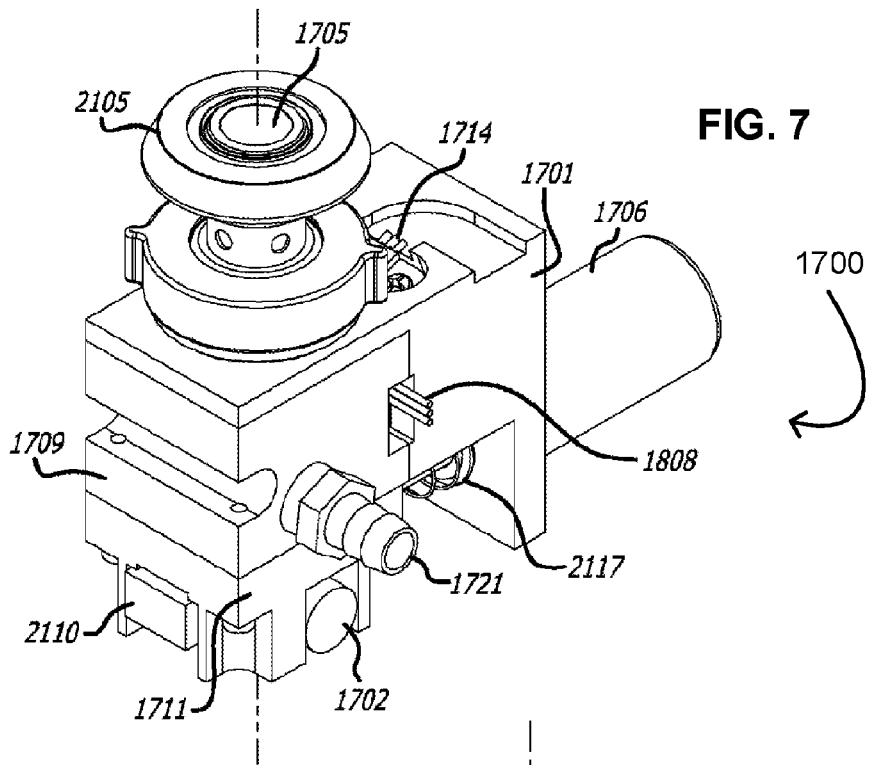
FIG. 7 illustrates a rear, left, top view of a valve of a beverage dispensing system in accordance with some embodiments.

FIG. 7 illustrates a rear, left, top view of the valve 1700 in accordance with some embodiments.

The valve 1700 includes the housing body 1701, the valve block 1709, and the lower block 1711. The valve 1700 also includes the valve actuator assembly 1710, the fitting 1721 to a beverage source, and coupler 2105 to couple to a beverage container (not shown). In some embodiments, the valve actuator assembly 1710 can include a solenoid 1706, solenoid spring 2117, and solenoid plunger 2207 (see FIG. 8). When actuated, the solenoid 1706 moves the ramp 2110 toward the solenoid 1706. In some embodiments, the ramp 2110 includes a larger width end 2311 and a narrower width end 2312 (see FIG. 9). The top surface of the ramp 2110 is generally flat, while the bottom surface of the ramp 2110 has a wedge shape or is generally tapered from the larger width end 2311 to the narrower width end 2312. As the ramp 2110 is moved toward the solenoid 1706, the larger width end 2311 of the ramp 2110 is drawn toward the axis 1750 of the valve 1700. This movement of the ramp 2110 and its tapered bottom surface cause the slide rod 1702 to slide down relative to the housing body 1701, away from the valve 1700. The slide rod 1702 is coupled to a plunger shaft 2322 and a plunger 2326 (see FIG. 9). When the slide rod 1702 slides down relative to the housing body 1701, the plunger shaft 2322 and the plunger 2326 are pulled down, causing the valve 1700 to open. The solenoid spring 2117 is coupled to the solenoid 1706 and configured to return a plunger shaft 2322 (see FIG. 9) back to its original position after the solenoid 1706 has actuated, allowing the valve 1700 to close.

Figure 8:
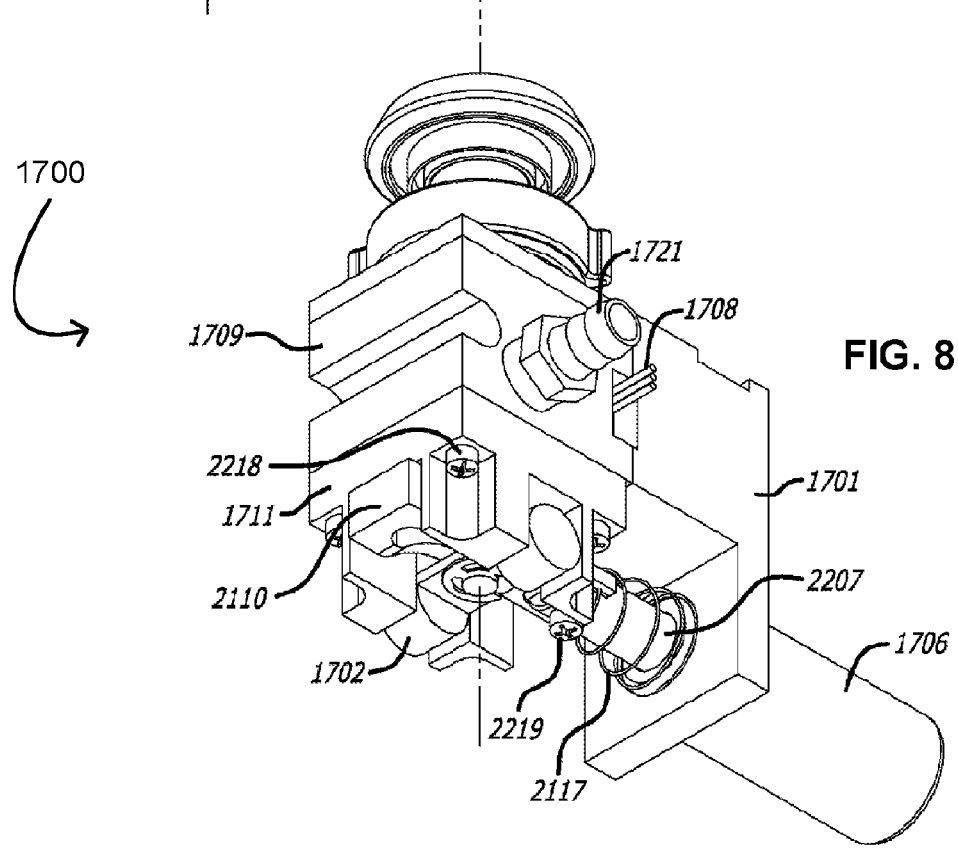
FIG. 8 illustrates a rear, left, bottom view of a valve of a beverage dispensing system in accordance with some embodiments.

FIG. 8 illustrates a rear, left, bottom view of the valve 1700 in accordance with some embodiments.

Four screws 2218 can be used to couple the lower block 1711 to the valve block 1709. Two screws 2219 can be used to couple the ramp 2110 to the lower block 1711. In some embodiments, the solenoid spring 2117 can have a uniformly expanding diameter such that one end of the solenoid spring 2117 has a larger diameter than the diameter at the opposite end. In some embodiments, the larger diameter end of the spring 2117 is coupled to the housing body 1701 and the smaller diameter end is coupled to the lower block 1711. The solenoid plunger 2207 is positioned within the solenoid spring 2115 and is coupled to the solenoid 1706 and the ramp 2110.

Figure 9:
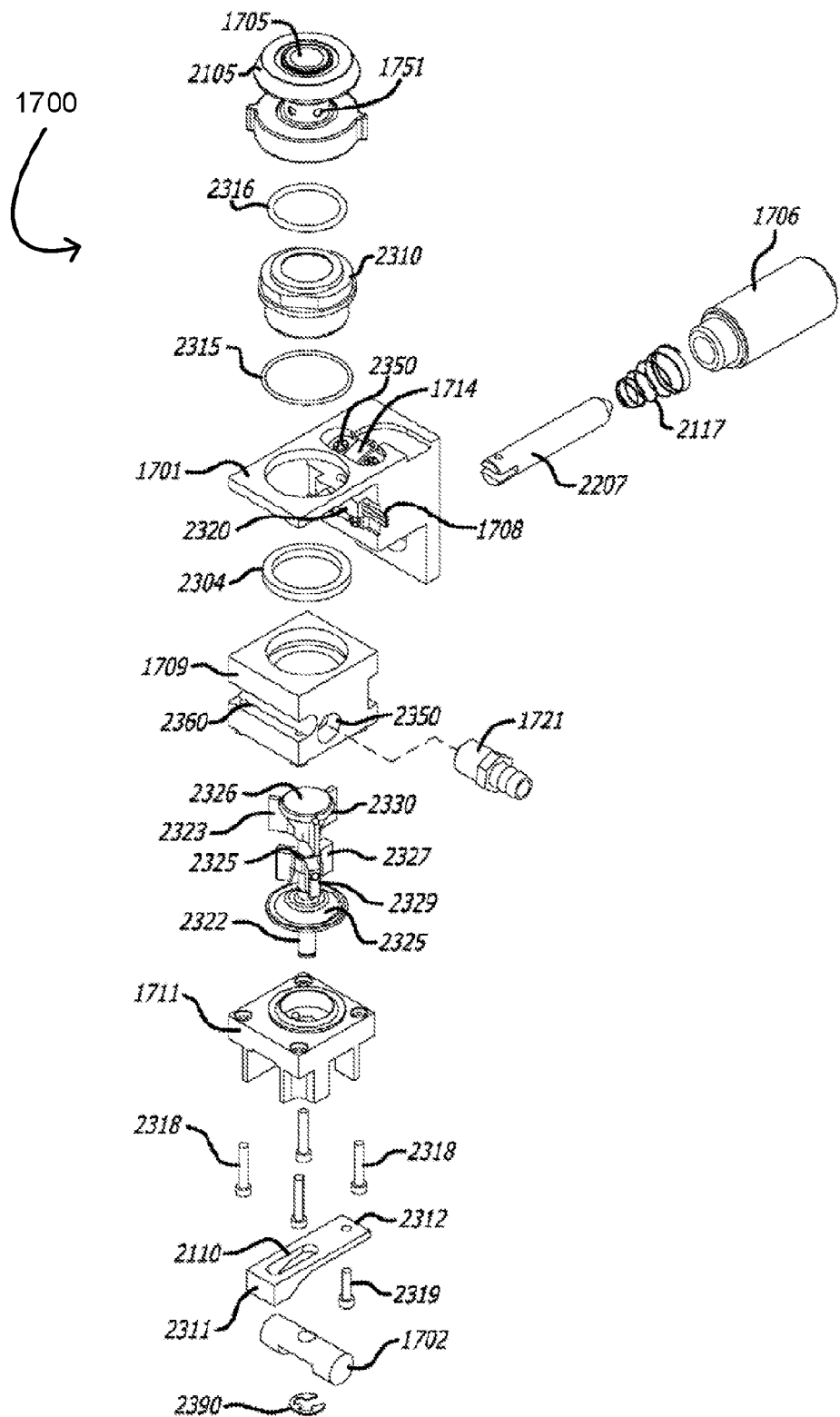
FIG. 9 illustrates a rear, left, top exploded view of a valve of a beverage dispensing system in accordance with some embodiments.

FIG. 9 illustrates a rear, left, top exploded view of the valve 1700 in accordance with some embodiments.

Describing from the top of FIG. 9, the valve 1700 can include a nozzle 1705, a coupler 2105, a first O-ring 2316, a valve case 2310, a second O-ring 2315, and the housing body 1701. The coupler 2105 is configured to couple the valve 1700 to a beverage container (not shown). When a beverage container is properly positioned, the coupler 2105 can cause the bottom of the beverage container to open by way of the nozzle 1705 enabling it to receive the beverage from the valve 1700. The nozzle 1705 is configured to be coupled to the beverage container. The nozzle 1705 includes a mating plate to interface with a corresponding mating plate on the bottom of the beverage container. When the bottom of the beverage container is pressed onto the nozzle 1705, the mating plate of the nozzle 1705 is mated with the mating plate of the beverage container as the nozzle 1705 goes inside the beverage container and opens the bottom of the beverage container. Exemplary mating plates and coupling devices for the beverage dispensing system and the beverage container are described in International Patent Application No. PCT/US12/72155, filed on Dec. 28, 2010, which is incorporated herein by reference in its entirety. The coupler 2105 can be coupled to the valve 1700 at the valve case 2310 with the first O-ring 2316 or other seal between the valve case 2310 and the nozzle 1705. The second O-ring 2315 or other seal can be used between the valve case 2310 and the housing body 1701. The housing body 1701 can be coupled to the solenoid plunger 2207, the solenoid spring 2117, and the solenoid 1706, which are used for opening and closing the valve 1700.

The housing body 1701 can also include the fluid sensor 1708 and the beverage container sensor 1714. A pair of screws 2320 can be used to couple the fluid sensor 1708 to the housing body 1701. A pair of screws 2350 can be used to couple the beverage container sensor 1714 to the housing body 1701. The fluid sensor 1708 is configured to detect the amount of beverage dispensed into the beverage container. The beverage container sensor 1714 is configured to detect the presence of a beverage container, proper placement of the beverage container, or both. For example, the beverage container sensor 1714 can be a Hall effect sensor used for detecting a magnet within a base of the beverage container. Any magnetic material can be used. Other sensors can also be used, such as pressure sensors, or mechanical devices, such as push plates or buttons contacted by the coupled beverage container. For example, insofar as detecting proper placement of a beverage container by the beverage container sensor 1714, detecting the proper placement of a beverage container on each valve of one or more valves of the beverage dispensing system can be alternatively or additionally effected by a beverage container position sensor 1928 (see FIG. 19) built into the coupler 2105 or the nozzle 1705 itself. Such a beverage container position sensor can be, for example, an eddy current displacement sensor or a capacitive displacement sensor. The beverage dispensing system can be configured such that each beverage container position sensor detects or reports proper beverage container position on its respective valve or the beverage-container coupler thereof before any beverage dispensation.

A third O-ring 2304 is positioned between the housing body 1701 and the valve block 1709. Coupled to the valve bock 1709 via opening 2350 is the fitting 1721. The fitting 1721 can include a barbed end in order to fit a beverage conduit or tube. Other connections are also contemplated including a threaded mating member. The valve 1700 can include valve block 1709 and lower block 1711 along with housing body 1701 to enclose the valve components and to couple to the actuator assembly 1710. In some embodiments, a plunger 2326 is used to control the flow of the beverage. The plunger 2326 can close or seal the beverage flow path when in one position, and the plunger 2326 can open the beverage flow path when moved longitudinally to another position. For example, the plunger 2326 is coupled to plunger shaft 2322 connected to the actuator assembly 1710. In a closed position, the plunger 2326 rests against the valve case 2310 to seal the valve 1700 and prevent beverage flow from the valve 1700 to a beverage container. The actuator assembly 1710 can include the solenoid 1706, the solenoid spring 2117 and the solenoid plunger 2207. The solenoid plunger 2207 can directly or indirectly (through linkages) control the valve plunger 2326.

As shown in FIG. 9, the solenoid plunger 2207 is coupled to the ramp 2110. The ramp 2110 has a generally wedge-shaped bottom surface, with the larger width end 2311 positioned away from the solenoid 1706. The slide rod 1702, coupled to the plunger shaft 2322, rests against the ramp 2110. When actuated, the solenoid 1706 pulls the solenoid plunger 2207 away from the housing body 1701 and toward the solenoid 1706. As the solenoid plunger 2207 is pulled, the coupled ramp 2110 is also pulled in the same direction, causing the wedged bottom surface of the ramp 2110 to gradually forces the slide rod 1702 downward and away from the housing body 1701 (along the axis 1750). The pulling of the solenoid plunger 2207 also causes the solenoid spring 2117 to coil. As the slide rod 1702 is forced downward, it pulls the plunger shaft 2322 along the axis 1750. This causes the plunger 2326 to move into the open position, open the value 1700, and permit a beverage flow path around the top of the plunger 2326. After the solenoid 1706 has actuated, the solenoid spring 2117 uncoils and returns the solenoid plunger 2207 and the ramp 2110 back to their original positions. This causes the plunger shaft 2322 and the plunger 2326 to return to their previous positions and close the valve 1700 and the beverage flow path. The linkages including the ramp 2110 and the slide rod 1702 permit the translation of the solenoid plunger 2207 to operate perpendicularly from the translation of the plunger shaft 2322. Thus, the valve 1700 and actuator assembly 1710 can be stored in a more compact area.

In some embodiments, the plunger shaft 2322 includes a turbine 2327 having two or more fins. When the beverage enters the valve block 1709 via the fitting 1721, it is off axis and thus rotates around the valve axis 1750. The rotating beverage spins the turbine 2327. The turbine fins can include magnets 2329 that are detected by the fluid sensor 1708. The fluid sensor 1708 can be a Hall effect sensor to detect the presence of the magnets 2329. As the turbine 2327 rotates, the magnet is sensed. The number of rotations can be used by the processor to calculate the beverage flow rate. From the beverage flow rate, the desired volume can be dispensed by allowing the beverage to flow for the required amount of time. Various sensors and sensing systems can be employed to sense the beverage dispense. The valve 1700 can also include a flow guide 2323 near the plunger 2326 in order to direct the beverage flow and reduce the flow rotation. The flow guide 2323 can also be used to guide the plunger shaft 2322 so that a fourth O-ring 2330 (e.g., a plunger seal) is properly seated within the valve case 2310 to close the valve 1700.

In some embodiments, the valve 1700 uses a diaphragm 2325 with a pressure plate (not shown) under it to equalize the pressure inside the valve 1700. The pressure of the beverage pushes down on the diaphragm 2325 and pressure plate (not shown) with the same force as the pressure place pushes up on the plunger 2326. Thus, it is possible to open the valve 1700 with less force, allowing a much smaller solenoid 1706 than would otherwise be required and eliminates the need for a wiper seal, which can be costly and provide design complications. The valve 1700 can also include a temperature-controlled system to control the temperature of the beverage during dispensing. A conduit 2830 (see FIG. 12) can clip into the notch 2360 of the valve block 1709. The conduit 2830 can be a copper tube. Beverage conduits can be run along the conduit 2830 as they enter the valve 1700. For example, chilled beverage can be run through the conduit 2830 to enable the beverage to remain cold while it is dispensed.

O-rings or other seals can be used to couple the various components of the valve 1700. For example, the first O-ring 2316 can create a seal between the valve case 2310 and the nozzle 1705, the second O-ring 2315 can create a seal between a drain pan (not shown) and the valve case 2310, and the third O-ring 2304 can create a seal between the valve case 2310 and the valve block 1709. Various mechanical devices can be used to couple the components together, such as screws, adhesives, bonding, etc. For example, screws 2318 can be used to hold the lower block 1711 to the valve block 1709, and screw 2319 can be used to hold the ramp 2110 to the solenoid plunger 2207. Retaining ring 2390 can be an e-clip to hold the slide rod 1702 onto the plunger shaft 2322. Retaining ring 2328 can be used to hold the turbine 2327 in place. There can be one retaining ring 2328 above and another retaining ring 2328 below the turbine 2327.

Figure 10:
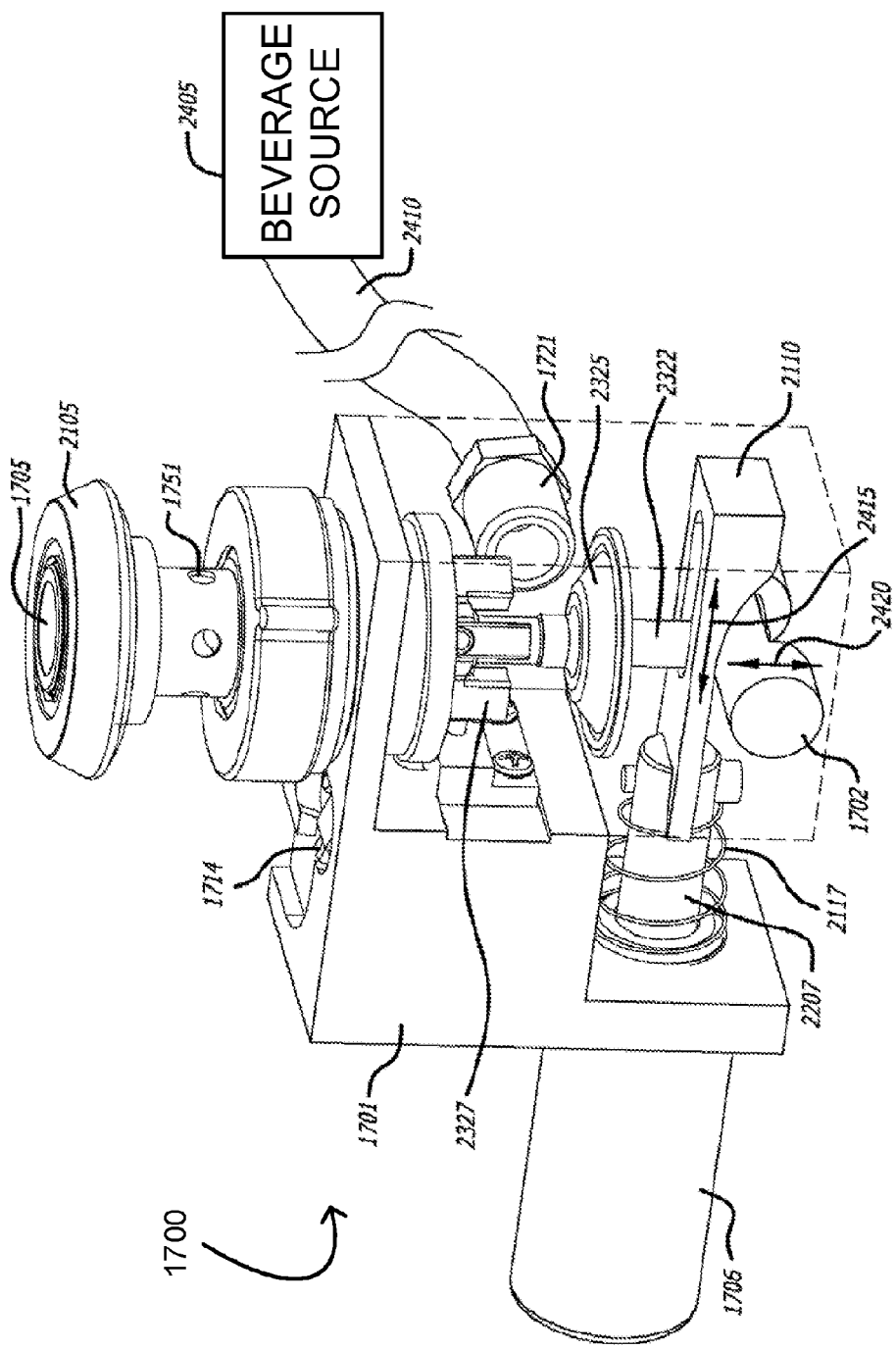
FIG. 10 illustrates a rear, right, top view of a valve with the valve block and the lower block shown in broken lines to illustrate some internal components of the valve in accordance with some embodiments.

FIG. 10 illustrates a rear, right, top view of the valve 1700 with the valve block and the lower block shown in broken lines to illustrate some internal components of the valve in accordance with some embodiments.

The valve 1700 includes the housing body 1701 and some of the components of the valve 1700. This includes the slide rod 1702, the ramp 2110, the solenoid spring 2117, the solenoid plunger 2207, and the solenoid 1706. The valve 1700 also includes the plunger shaft 2322, the diaphragm 2325, and the turbine 2327. The ramp 2110 has a generally wedge-shaped bottom surface, with a larger width end 2311 and a smaller width end 2312, where the larger width end 2311 is positioned away from the solenoid 1706. The ramp 2110 is coupled to the solenoid plunger 2207 at the smaller width end 2312. When actuated, the solenoid 1706 pulls the solenoid plunger 2207 away from the housing body 1701 toward the solenoid 1706 along one direction of the double arrow 2415. The wedged bottom surface of the ramp 2110 forces the slide rod 1702 down, away from the housing body 1701 along one direction of the double arrow 2420. As the slide rod 1702 is forced downward, it pulls the plunger shaft 2322 down, causing the valve 1700 to open and creating a beverage flow path. As the solenoid plunger 2207 is pulled by the solenoid 1706, the solenoid spring 2117 is coiled. The solenoid spring 2117 then uncoils and returns the solenoid plunger 2207 back to its original position along the other direction of the double arrow 2415 after the solenoid 1706 has actuated. Returning the solenoid plunger 2117 to its original position causes the slide rod 1702 to push the plunger shaft 2322 upward along the other direction of the double arrow 2420, causing the valve 1700 to close. The opening and closing of the valve 1700 affects the flow of the beverage from the beverage source such as, for example, the beverage supply 2405 via source hose 2410.

Figure 11:
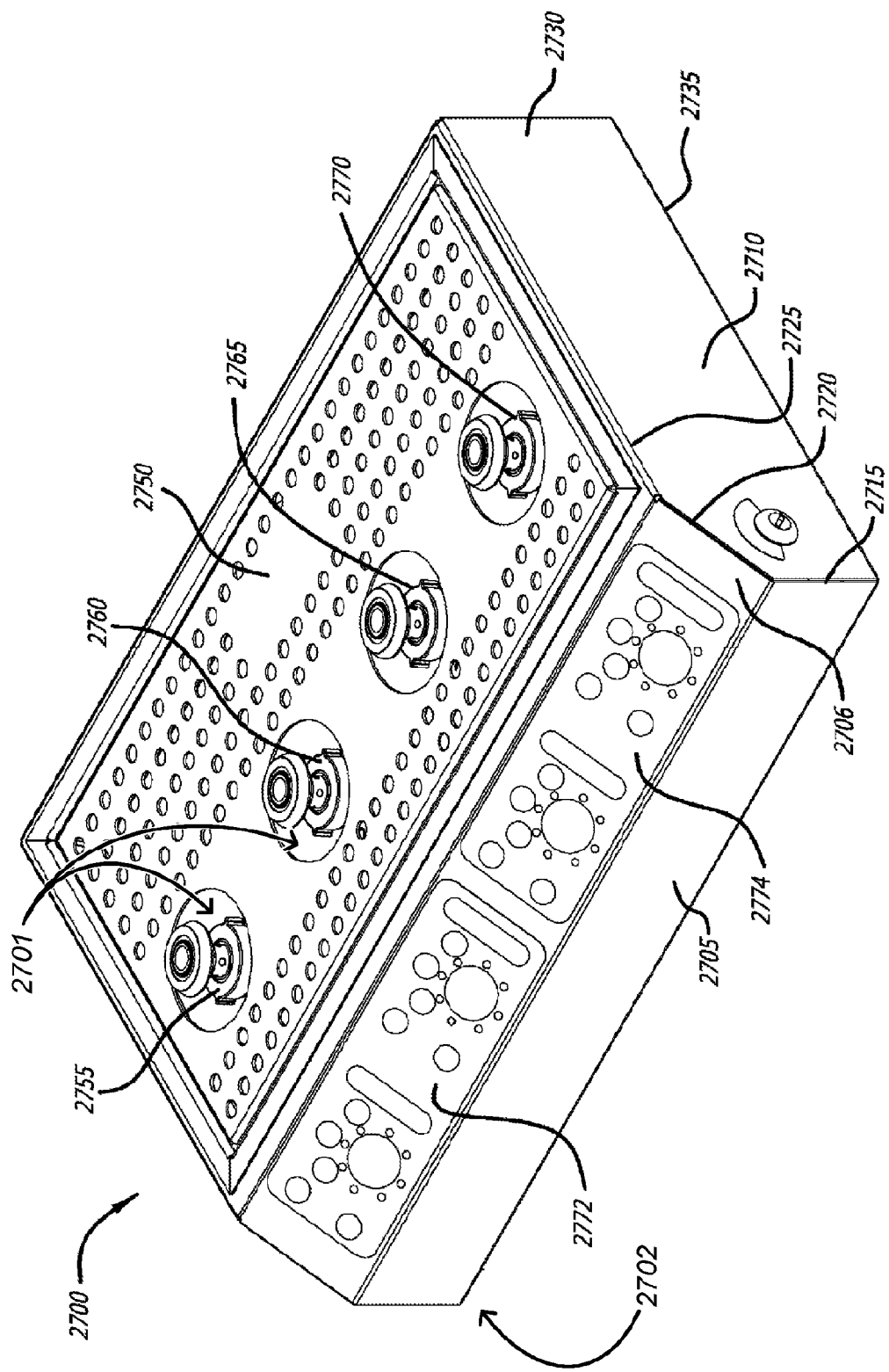
FIG. 11 illustrates a front, top, right view of a housing of a beverage dispensing system having multiple valves in accordance with some embodiments.

FIG. 11 illustrates a front, top, right view of a beverage dispensing system 2700 having multiple valves in accordance with some embodiments.

A housing 2702 of the beverage dispensing system 2700 includes a first front wall 2705 coupled to a second front wall 2706. The second front wall 2706 is coupled to a top wall 2807, which in turn is coupled to a back wall 2808. The second front wall 2706 is connected to and positioned between the first front wall 2705 and the top wall 2807 at an angle. In some embodiments, the second front wall 2706 can be configured to display a user interface (e.g., user interface 1600 or 2772) to allow a user to select options, view status, etc. The housing 2702 also includes a first side wall 2710 and a second side wall 2810. Each of the first side wall 2710 and the second side wall 2810 has five edges. The first edge has a length dimension 2715 which is the same as the width of the first front wall 2707. The second edge has a length dimension 2720 which is the same as the width of the second front wall 2706. The third edge has a length dimension 2725 which is the same as the width of the top wall 2807. The fourth edge has a length dimension 2730 which is the same as the width of the back wall 2808. The fifth edge has a length dimension 2735 which is the same as a distance from a bottom of the first front wall 2705 to the bottom of the back wall 2808. In some embodiments, the housing 2702 can include one or more openings 2701 to receive one or more valves 2755, 2760, 2765 and 2770 such as the valve 1700. The one or more openings 2701 can be in the top wall 2807. (See FIG. 12.) For example, the top wall 2807 includes four openings (not shown in FIG. 12) to receive the four valves 2755, 2760, 2765 and 2770. Illustrated in FIG. 11 are the four nozzles and couplers of the valves 2755-2770. The remaining portions of the four valves 2755-2770 are hidden from view by the top wall 2807. The external surface of the top wall 2807 can be considered a filling area.

In some embodiments, a dispensing platform 2750 can be used with the top wall 2807. For example, the dispensing platform 2750 can be placed over the top wall 2807 and is configured such that there is a clearance between a surface of the dispensing platform 2750 and a surface of the top wall 2807, providing an elevated dispensing platform. There can be multiple openings, or perforations, in the surface of the dispensing platform 2750. These perforations allow any beverage spillage to go through the surface of the dispensing platform 2750 to the surface of the top wall 2807 of the filling area. In some embodiments, the beverage dispensing system 2700 can also include a drainage system around the filling area. The drainage system can remove any spilled beverage from the dispensing platform 2750 and use drain conduits or tubes to transport the beverage to a disposal system such as a drain or sink. The drainage system can surround the beverage dispensing system 2700 or dispensing platform 2750 to keep the serving area relatively free from standing beverage. The dispensing platform 2750 also includes one or more openings 2701 to respectively accommodate one or more valves (e.g., the valves 2755-2770). The one or more valves 2755-2770 can be at least partially below the dispensing platform 2750 such that each valve includes its beverage-container coupler (e.g., coupler 2105 of FIGS. 7 and 9) extending from the valve through a corresponding opening in the dispensing platform 2750, wherein the beverage-container coupler 2105 is configured to couple with bottom-fillable beverage containers for use with the beverage dispensing system 2700. The combination of the housing 2702 and the valves 2755-2770 together with the connections to the beverage sources provides the beverage dispensing system 2700, which can be placed on an existing counter top or can be incorporated into a counter or serving surface.

Figure 15:
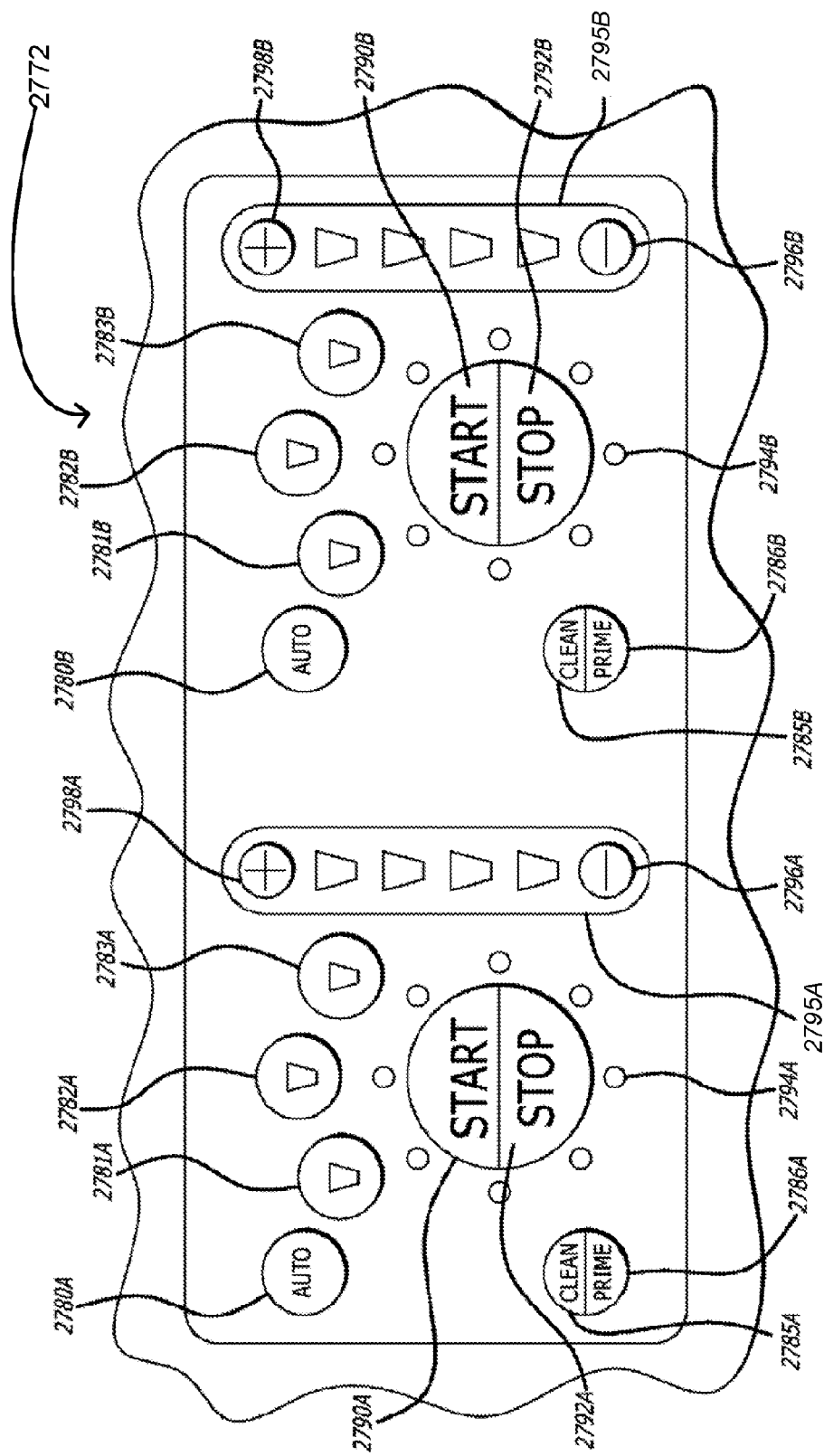
FIG. 15 illustrates a close-up view of a first user interface in accordance with some embodiments.
Figure 16:
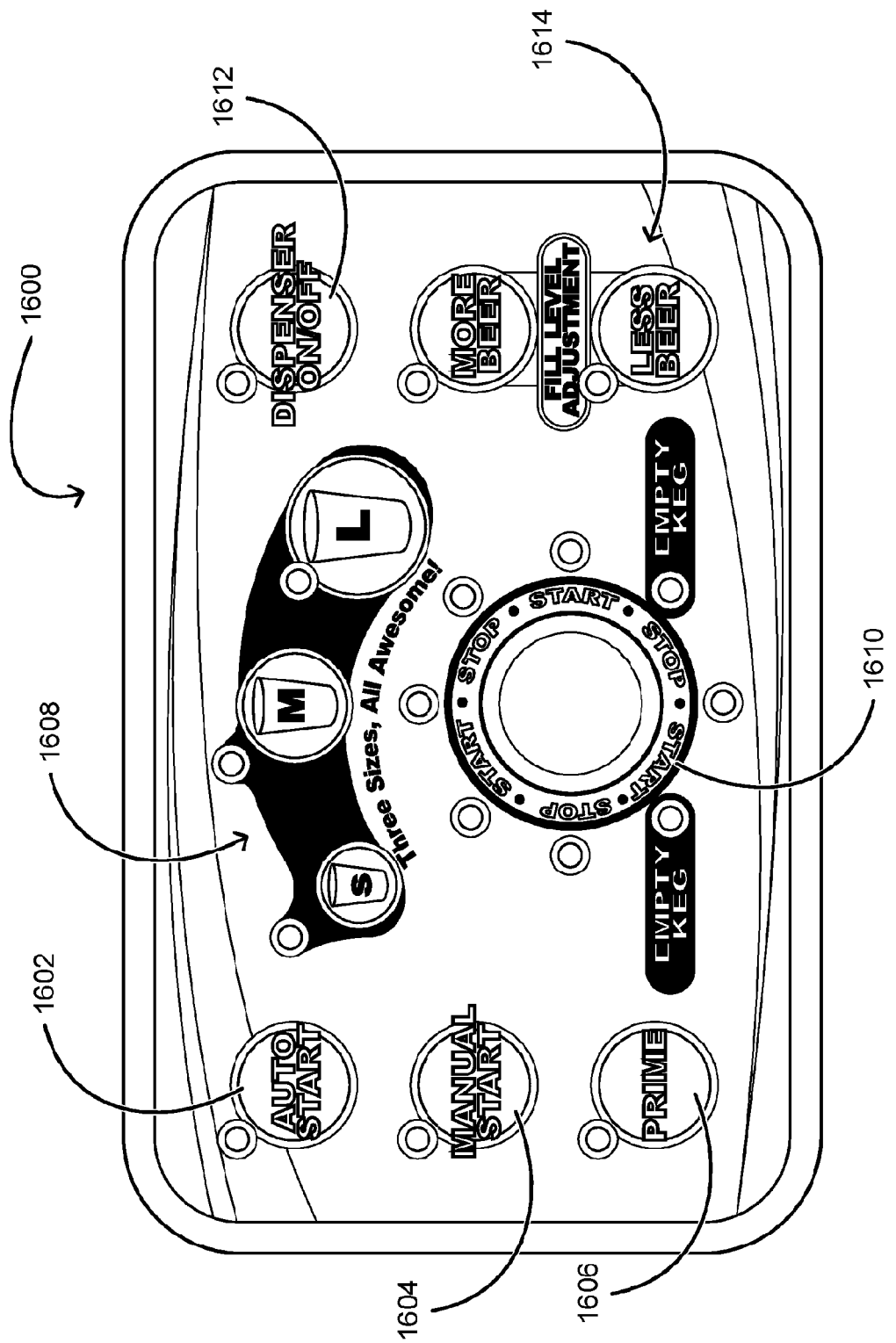
FIG. 16 illustrates a close-up view of a second user interface in accordance with some embodiments.

In some embodiments, the beverage dispensing system 2700 can include a user interface such as the first user interface 2772 of FIG. 15 or the second user interface 1600 of FIG. 16, each of which provides filling options for one or more valves 2755-2770 of the beverage dispensing system 2700. For example, the second user interface 1600 provides filling options for one valve of the beverage dispensing system 2700, whereas the first user interface 2772 of FIG. 15 includes filling options for two valves of the beverage dispensing system 2700. As described herein below, each user interface is part of a valve-controlling module configured to be disposed in a cutout of the housing 2702. An example of the first user interface 2772 is illustrated in FIG. 11 as disposed in a cutout of the housing 2702, specifically a cutout of the second front wall 2706 of the housing 2702. Indeed, the second front wall 2706 can include the first user interface 2772, and a second user interface 2774 like the first user interface 2774. The first user interface 2772 can include options associated with the valve 2755 and similar options associated with the valve 2760. The second user interface 2774 can include options associated with the valve 2765 and similar options associated with the valve 2770.

While the beverage dispensing system 2700 is described as including the foregoing housing 2702, it should be understood that the beverage dispensing system 2700 can include a different housing configuration such as a housing configured for wall mounting, a different type of housing altogether such as a countertop or a lid of a portable cooler (i.e., a portable ice chest), or no housing at all if preferred. That said, a housing such as the housing 2702 provides a convenient option for mounting the one or more valves 2755-2770 of the beverage dispensing system 2700 along with any user interfaces (e.g., the first user interface 2772, the second user interface 2774, etc.) for using the beverage dispensing system 2700.

Figure 12:
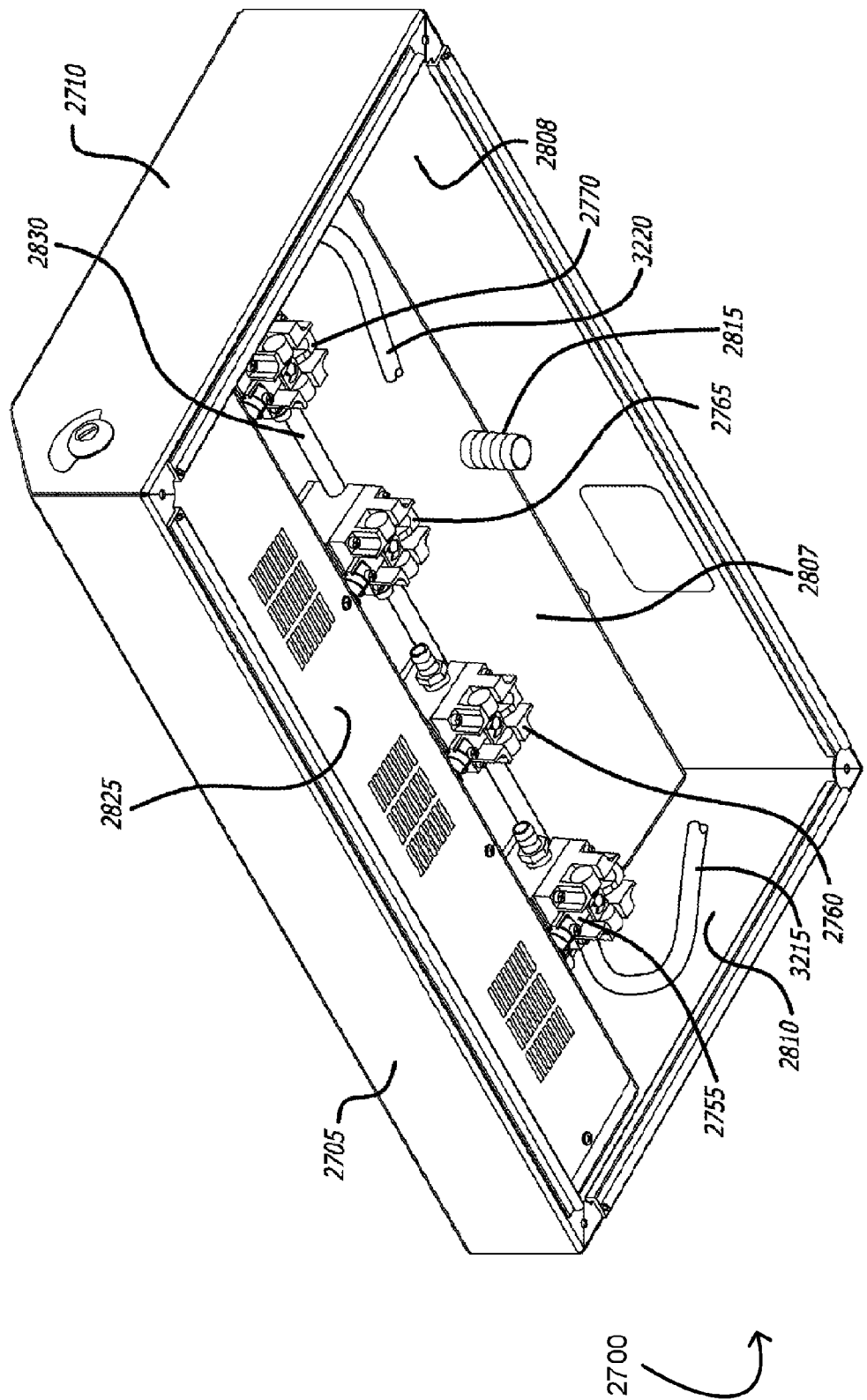
FIG. 12 illustrates a bottom, front, right view of a beverage dispensing system having multiple valves in accordance with some embodiments.

FIG. 12 illustrates a bottom, front, right view of the beverage dispensing system 2700 having multiple valves in accordance with some embodiments.

The four valves illustrated in FIG. 12 correspond to the four valves 2755-2770 illustrated in FIG. 11 and reflect the portions of the valves 2755-2770 that are not visible in FIG. 11. As illustrated, the valves 2755-2770 are not connected to any beverage sources. In some embodiments, the top wall 2807 can also include an opening to receive a drain fitting 2815 to drain any beverage that is spilled onto the filling area. In the current example, the drain fitting 2815 is positioned near the back wall 2808. The drain fitting 2815 can be coupled to a drain conduit (not shown). The drain conduit can couple a drainage area from the filling area of the beverage dispensing system 2700 to a drainage location such as a floor drain or a sink. The drain conduit can be a tube connecting the drainage area with the drainage location. A conduit 2830 can clip into the valves 2755-2770 to cool the valves by at least thermal conduction in order to deliver temperature-regulated beverage. Beverage conduits can run along the conduit 2830 so that the beverage in the beverage conduits can remain at a desired temperature during transport. The regulated fluid can be transported generally in parallel to the beverage conduits or can generally coil or wrap around the beverage conduits. The regulated fluid and the beverage from the beverage source can also be run through cooperating conduits such as concentric conduits. A pump can be used to transport the regulated fluid from a source thereof to one of the valves 2755-2770 of the beverage dispensing system 2700 to keep the beverage at a particular temperature up to dispensation of the beverage at the valve. A temperature regulator can use heated or cooled regulated fluid, either liquid or gas, to maintain the temperature of the regulated fluid and therefore the temperature of the beverage from the beverage source.

Figure 13:
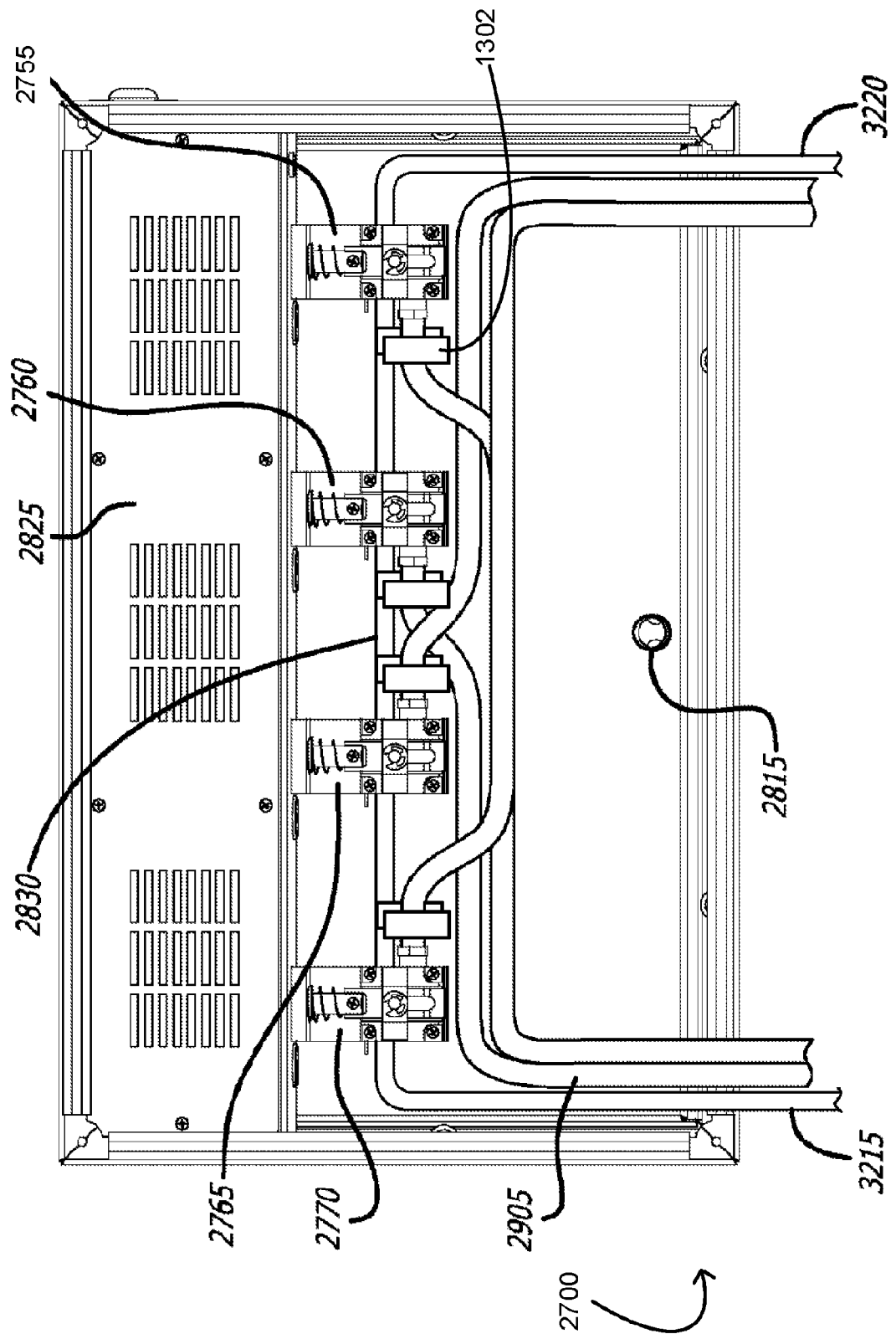
FIG. 13 illustrates a bottom view of a beverage dispensing system showing beverage tubes connected to valves in accordance with some embodiments.

FIG. 13 illustrates a bottom view of the beverage dispensing system 2700 showing beverage conduits connected to valves in accordance with some embodiments.

A beverage conduit 2905 can be coupled to a fitting (e.g., fitting 1721), or it can be directly coupled to a valve (e.g., valve 2755). The fitting can be barbed or threaded which directly or indirectly couples to the beverage conduit 2905. The beverage conduit 2095 can be a tube such as a tube of Tygon® tubing. There is one beverage conduit 2905 for each valve of the valves 2755-2770. Illustrated in the current example are four source conduits for the four valves 2755-2770. A threaded member is coupled to a valve to connect to a corresponding threaded member from the beverage conduit 2905.

The beverage dispensing system 2700 can include one or more clear object detectors, each of which is associated with a beverage conduit leading to a valve of the one or more valves 2755-2770. Each clear object detector is configured for detecting clarity in a beverage conduit. One such clear object detector is shown in FIG. 13 as clear object detector 1302. An example clear object detector is an LED-based or laser-based retroreflective sensor. Another example clear object detector is an ultrasonic sensor.

Figure 14:
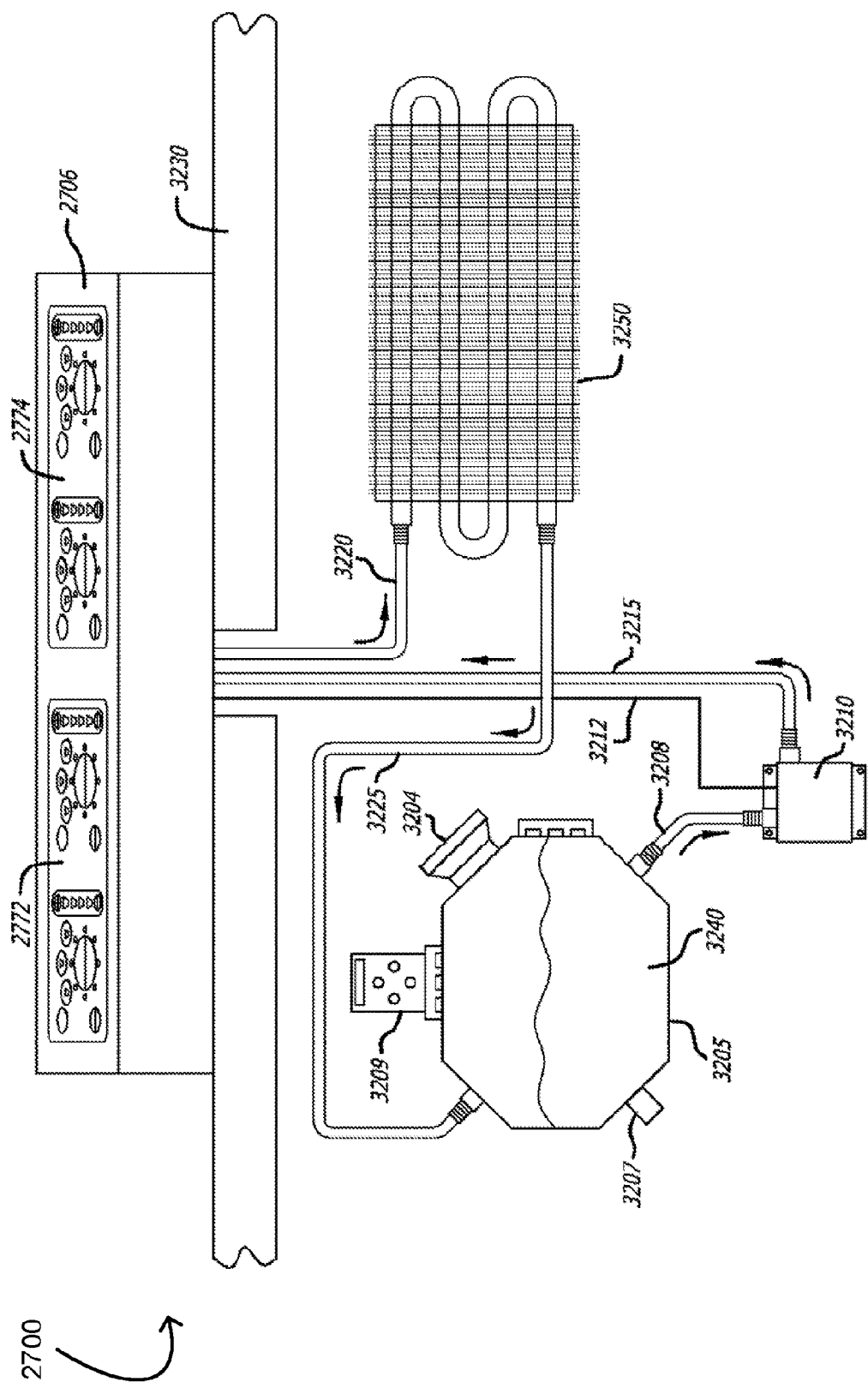
FIG. 14 illustrates a cooling system showing how the temperature of the beverage can be controlled during transport in accordance with some embodiments.

FIG. 14 illustrates a cooling system of the beverage dispensing system 2700 showing how the temperature of the beverage can be controlled during transport in accordance with some embodiments.

The cooling system can include a cooled or cold liquid. Liquid 3240 can be, for example, glycol, water, or a saline solution, either chilled or iced, or some other cold liquid. The liquid 3240 (e.g., glycol) can help keep the beverage (e.g., beer) chilled all the way up to the point of dispensation. The liquid 3240 can be held in a tank or container 3205. The tank 3205 can be filled or partially filled with the cooling liquid 3240. The tank 3205 can include an inlet 3204 and an outlet 3207. The tank 3205 can also include a first coupler to couple with an incoming conduit 3225 and another coupler to couple with an out-going conduit 3208. The tank 3205 can also include a monitoring device 3209 for monitoring purposes including, for example, level of the liquid 3240 inside the tank 3205, temperature of the liquid 3240, etc. In some embodiments, the cooling system can be portable and can include an ice bath to submerge (fully or partially) and chill the tank 3205 and the liquid 3240.

Pump 3210 can be used to pump the liquid 3240 from the tank 3205. The pump 3210 can be powered using the same power source that is used to power the beverage dispensing system 2700, or it can use a separate power source. Power is delivered to the pump 3210 via power line 3212. The pump 3210 can be used to circulate the liquid 3240 through a system of cooling conduits including the conduit 2830 illustrated in FIG. 12. For example, the out-going conduit 3208 is used to transport the liquid 3240 from the tank 3205 to the pump 3210. Conduit 3215 is used to transport the liquid 3240 from the tank 3205 to the beverage dispensing system 2700. The conduit 2830 is used to transport the liquid 3240 though the beverage dispensing system 2700 by being connected or clipped to the valves 2755, 2760, 2765, and 2770. Conduit 3220 is used to transport the liquid 3240 away from the valves 2755, 2760, 2765, and 2770 to be cooled by a fan or a radiator 3250. The conduit 3220 can be coupled to the radiator 3250 through an incoming coupler of the radiator 3250. The in-coming conduit 3225 is used to transport the liquid 3240 from the fan or the radiator 3250 back to the tank 3205. The in-coming conduit 3225 can be coupled to the radiator 3250 through an out-going coupler of the radiator 3250. Illustrated in FIG. 14 are directional arrows that show the directions of the liquid 3240 along each of the mentioned conduits.

The conduit 3215 can run along the beverage conduits 2095 to maintain the beverage at the desired temperature during transport. The conduit 3215 can run parallel to the beverage conduits 2095, circumferentially surround the beverage conduits 2095 (for example, coils), or combinations thereof (for example, helical line).

In some embodiments, the conduits 3215, 3220, and 3225 can be made of stainless steel or copper or other material of high thermal conductivity. In some embodiments, temperature regulated air can be used to maintain the conduit 3215 and the source conduits 2095 at a desired temperature. For example, the beverage source 2405 can be housed within a refrigeration unit to maintain the beverage at a desired temperature. A cooled air line can then be used with the conduit 3215 to maintain the temperature of the beverage from the beverage source 2405 to the beverage dispensing system 2700 during transport.

The beverage dispensing system 2700 can be placed on an existing counter top or can be incorporated into a counter or serving surface 3230. Alternatively, the beverage dispensing system 2700 can be provided as components that can be incorporated into a serving area as required by the location. In some embodiments, the beverage dispensing system 2700 can include areas where information can be displayed and visible. For example, images, graphics, product logos, customer icons, etc. can be displayed in any area of the first front wall 2705. The information can be integrated into the some of the functions of a valve (e.g., one of the valves 2755-2770) including, for example, the on/off or start/stop mechanisms. The information can be displayed for purely aesthetic purposes. For example, the customer icon can be the traditional beer taps associated with the beers dispensed by the beverage dispensing system 2700.

FIG. 15 illustrates a close-up view of the first user interface 2772 in accordance with some embodiments.

The user interface 2772 can include a user-facing touchpad with one or more physical buttons or a user-facing touchscreen with one or more on-screen buttons. The physical or on-screen buttons are configured to control a corresponding valve of the one or more valves 2755-2770. As described herein below, whether a user-facing touchpad or touchscreen, the user interface 2772 is part of a valve-controlling module, which, in turn, is part of an embedded system of the beverage dispensing system 2700.

The user interface 2772 can include options for automatic, semi-automatic or manual control. The diagram illustrated in FIG. 15 can correspond to the first user interface 2772 of FIG. 11 or the second user interface 2774 of FIG. 11. For automatic filling, the beverage container size and/or filling level can be selected. For example, to set the automatic mode, the automatic option 2780A can be selected, and then one of the beverage container size options 2781A, 2782A and 2783A can be selected. In this mode, when a beverage container is properly placed in or on the dispensing platform 2750, the beverage is automatically dispensed into the beverage container, and the beverage flow is automatically stopped after a pre-determined volume of beverage has been dispensed. The volume of beverage to be dispensed is determined based on the selected beverage container size option. The user interface 2772 can include the start option 2790A and the stop option 2792A, which can be used in the manual mode or semi-automatic mode. For example, in full manual mode, the user can start dispensing the beverage into the beverage container by selecting the start option 2790A. The user can then select the stop option 2792A at the appropriate time to stop the beverage flow into the beverage container.

In the semi-automatic mode, the user can select the automatic option 2780A, select one of the beverage container size options 2781A-2783A and cause the beverage to flow automatically into the beverage container by properly placing the beverage container onto the dispensing platform 2750. In this example, instead of waiting for the beverage flow to stop automatically the user can select the stop option 2792A prior to the pre-determined volume of beverage is dispensed into the beverage container. As another example of using the semi-automatic mode, the user can select one of the beverage container size options 2781A-2783A, place a beverage container onto the dispensing platform 2750, and then manually select the start option 2790A. The beverage dispensing system 2700 can then dispense the beverage into the beverage container and stops dispensing after an appropriate volume of beverage is dispensed. The volume to be dispensed is based on the selected beverage container size.

The user interface 2772 can also include cleaning option 2785A and priming option 2786A. Status information can also be displayed on the user interface 2772. The status information can indicate to the user whether the beverage dispensing system 2700 is ready to dispense. In some embodiments, the status information can be implemented using a visible indicator such as a light. For example, the user interface 2772 can set the light 2794A to display a green color indicating that the beverage dispensing system 2700 is ready to dispense, or it can set the light 2794A to display a red color indicating that the beverage dispensing system 2700 is not ready to dispense. As another example, a set of green lights positioned around the start and stop options 2790A, 2792A can be illuminated to indicate that the nozzle of the corresponding valve (e.g., one the valves 2755-2770) is open. A set of red lights can be similarly positioned and can be illuminated when the corresponding valve is closed. As mentioned, the beverage container sensor 1714 can be used to detect the presence and/or the proper placement of the beverage container onto the dispensing platform 2750, and the fluid sensor 1708 can be used to determine the volume of beverage dispensed.

In some embodiments, the user interface 2772 can also include beverage volume options 2795A to control the beverage volume (or fill level) to be automatically dispensed into a beverage container. For example, the user can use the decrease option 2796A (e.g., a button with a minus sign) to decrease the volume and the increase option 2798A (e.g., a button with a plus sign) to increase the volume. Although not shown, the user interface 2772 can include other controls, user information, or indicators.

The first user interface 2772 is illustrated to include another user interface for a second valve (e.g., one of the valves 2755-2770) and configured to have the same set of options. This includes the automatic option 2780B, the beverage container size options 2781B, 2782B, 2783B, the cleaning option 2785B, the priming option 2786B, the start option 2790B, the stop option 2792B, the light 2794B, the beverage volume options 2795B with the fill level decrease option 2796B and increase option 2798B, and so on. In some embodiments, each of the valves 2755-2770 and corresponding user interfaces can be associated with a same type of beverage or a different type of beverage.

The options in the user interface 2772 can include electrical or mechanical options such as, for example, touch screen, buttons, toggles, switches, dials, knobs, lights, sounds, etc. In some embodiments, the user interface 2772 is associated with electronic components including the processor. The user interface 2772 and electronics can be separated from the valve and beverage source by a dividing plate 2825 (see FIG. 12). The dividing plate 2825 can also include openings to provide air flow and to reduce overheating of the electronic components. Locking mechanism 2835 can be used to keep the dividing plate 2825 in place.

FIG. 16 illustrates a close-up view of a second user interface 1600 in accordance with some embodiments.

As shown, the second user interface 1600 includes either physical or on-screen buttons configured to control a corresponding valve of the one or more valves 2755-2770. LEDs can be used adjacent physical buttons to indicate toggle states (e.g., on or off) for the physical buttons or press indicators for the physical buttons. On-screen graphical indicators can be likewise used adjacent on-screen buttons to indicate toggle states (e.g., on or off) for the on-screen buttons or press indicators for the on-screen buttons. The buttons can include, but are not limited to, an auto-start button 1602, a manual start button 1604, a prime button 1606, one or more beverage-size buttons 1608, a start-stop button 1610, a valve on-off button 1612, and a fill level adjustment button 1614. Such buttons are described in reference to the first user interface 2772.

Embedded System

The beverage dispensing system 2700 includes an embedded system 1760 configured for beverage dispensation as well as analytics, communications, payment processing, or a combination thereof related to beverage dispensation.

FIG. 17 provides a schematic illustrating the embedded system 1760 of the beverage dispensing system 2700 in accordance with some embodiments.

As shown, the embedded system 1760 includes one or more valve-controlling modules 1900, one or more sensors 1920, and a central module 1800. The central module 1800 is communicatively coupled to at least the one or more valve-controlling modules 1900. Each valve-controlling module 1900 can be communicatively coupled to at least one of the one or more of the sensors 1920, which at least one sensor is configured to sense one or more aspects of valve operation. That said, the central module 1800 can be additionally or alternatively communicatively coupled to the one or more sensors 1920 to sense the one or more aspects of valve operation. Notwithstanding the foregoing, the central module 1800 can be communicatively coupled to at least one of the one or more of the sensors 1920, which at least one sensor can be configured to sense one or more aspects of operation of the entire beverage dispensing system 2700.

FIG. 18 provides a schematic illustrating the central module 1800 of the embedded system 1760 of the beverage dispensing system 2700 in accordance with some embodiments.

The central module 1800 includes a printed circuit board assembly with surface-mounted components. As shown in FIG. 18, the surface-mounted components are selected from a microcontroller 1802 with one or more programs (e.g., a payment processing program 1834) related to beverage dispensation stored in a memory (e.g., secondary memory) such as a read-only memory ("ROM") 1804 thereof, one or more networking interfaces 1806 including antennae, chips, or combinations thereof configured for external networking, one or more communication interfaces 1808 such as an infrared ("IR") receiver 1810 configured for direct operation of the beverage dispensing system 2700, one or more analog-to-digital converters (not shown), one or more digital-to-analog converters (not shown), one or more data ports 1812 configured for receiving at least sensor data from one or more valve-controlling modules 1900, non-volatile memory 1814 configured for storage of sensor data, statistics, analytics, or the like, or a connector configured for removable non-volatile memory, and one or more power connectors 1816.

The one or more networking interfaces 1806 include one or more wired networking interfaces 1818, one or more wireless networking interfaces 1820, or a combination thereof. The one or more wired networking interfaces 1818 include an ethernet port and an associated microchip 1822. The one or more wireless networking interfaces 1820 include one or more transmitter-receivers or transceivers (e.g., transmitter and receiver circuitry in one device) and at least one associated microchip optionally including the transmitter-receiver or transceiver on the microchip. The microchip can be configured for Wi-Fi, Bluetooth® ("BT"), NFC, or a combination thereof as shown, for example, by the Wi-Fi microchip 1824, Bluetooth® ("BT") microchip 1826, NFC microchip 1828.

At least one networking interface of the one or more networking interfaces 1806 can be configured to directly communicate with one or more point-of-sale service providers such as Oracle Hospitality (formerly Micros®) or indirectly communicate with the one or more point-of-sale service providers through a backend system 2204. (See FIG. 22.) One or more valve-actuating assemblies such as the valve-actuator assembly 1710 (see, for example, FIGS. 3, 4, and 6) are configured to remain locked until payment for one or more beverages is successfully processed by way of the one or more point-of-sale providers. If not locked, the one or more valve-actuating assemblies are configured to lock or adopt a locked state from an unlocked state upon a denied payment by way of the one or more point-of-sale providers.

A same or different networking interface of the one or more networking interfaces 1806 can be configured to directly communicate with an identity or age verification service provider or indirectly communicate with the one or more point-of-sale service providers through the backend system 2204. (See FIG. 22.) The one or more valve-actuating assemblies such as the valve-actuator assembly 1710 (see, for example, FIGS. 3, 4, and 6) are configured to remain locked until consumer age is verified by way of an identity or age verification service provider for one or more adult beverages. Consumer identification information for such age verification can be processed at a same time as payment for one or more beverages such as by swiping a state issued identification card or using a mobile web application as described herein below. Additionally or alternatively, an RFID tag reader 1830 of the central module 1800 can be used for consumer age verification. For example, a consumer can be issued a bracelet with an RFID tag subsequent to a manual age verification at an entry of a venue in which the beverage dispensing system 2700 is located. The RFID tag in the bracelet can be read by the RFID tag reader 1830 of the central module 1800 to unlock one or more valve-actuating assemblies for one or more beverages.

Additionally or alternatively to consumer age verification with the RFID tag reader 1830, the RFID tag reader 1830 of the central module 1800 can be configured to read RFID tags of servers for service records.

The central module 1800 can further include a GPS receiver 1832 including a GPS antenna and a GPS processor configured to determine a global position of the beverage dispensing system 2700. The global position of the beverage dispensing system 2700 can be used for comparison with a global position of a consumer by way of a consumer-associated mobile device to obviate fraudulent activity such as by spoofing. The global position of the consumer can be determined for comparison by way of a location shared by the consumer-associated mobile device with the beverage dispensing system 2700 through a mobile web application as described herein below. One or more valve-actuating assemblies (e.g., the valve-actuator assembly 1710) for one or more beverages are configured to remain in the locked state until consumer location is verified as a match to the beverage dispensing system 2700.

In view of the foregoing, up to at least a three-prong verification process can be used by the beverage dispensing system 2700. That is, the one or more valve-actuating assemblies for one or more beverages can be configured to remain in a locked state until payment for one or more beverages is successfully processed by way of one or more point-of-sale providers, consumer age is verified by way of an identity or age verification service provider or the RFID reader, consumer location is verified by way of a consumer-associated mobile device, or a combination thereof.

The central module 1800 can further include a statistics module 1836 configured for statistical analyses of sensor data from the one or more sensors 1920 provided by way of the one or more valve-controlling modules 1900. The one or more sensors 1920 are selected from at least a beverage flow meter 1922, a beverage temperature sensor 1924, an empty keg detector 1926, the container position sensor 1928, and one or more environmental sensors 1930 such as a thermometer, a hygrometer, or a barometer.

The central module 1800 can further include an analytics module 1838 configured to determine patterns from at least the statistical analyses of the sensor data, time of day from a time server or a real-time clock 1840 of the central module 1800, payment processing data, or a combination thereof. For example, the analytics module 1838 can be configured to determine a number of ounces poured for any one or more beverages per beverage container, consumer, or unit of time using data from one or more beverage flow meters (e.g., the beverage flow meter 1922) respectively corresponding to one or more valves (e.g., the one or more valves 2755-2770) of the beverage dispensing system 2700, the payment processing program 1834, the real-time clock 1840, or a combination thereof. For example, the analytics module 1838 can be configured to determine a temperature for any one or more beverages using data from one or more beverage temperature sensors (e.g., the beverage temperature sensor 1924), the payment processing program 1834, the real-time clock 1840, or a combination thereof. For example, the analytics module 1838 can be configured to determine a time of day each beverage was served using data from the payment processing program 1834 and the real-time clock 1840 of the central module 1800 of the beverage dispensing system 2700.

FIG. 19 provides a schematic illustrating a valve-controlling module 1900 of the embedded system 1760 of the beverage dispensing system 2700 in accordance with some embodiments.

Each valve-controlling module of one or more valve-controlling modules 1900 includes a printed circuit board assembly with surface-mounted components. The surface-mounted components are selected from a microcontroller 1902 with at least a valve-controlling program 1904 stored in a memory (e.g., secondary memory) such as a ROM 1906 thereof, a solenoid connector 1908 configured for connecting and controlling a solenoid of a valve-actuating assembly (e.g., the solenoid 1706 of the valve-actuator assembly 1710), one or more sensor connectors 1910 configured for respectively connecting and controlling the one or more sensors 1920, one or more data ports 1912 configured for sending at least sensor data from the valve-controlling module 1900 to the central module 1800, one or more analog-to-digital converters (not shown), one or more digital-to-analog converters (not shown), and one or more power connectors 1914.

The printed circuit board assembly of the valve-controlling module 1900 can be encased in a casing (see FIG. 20) configured to protect the printed circuit board assembly from spilled beverages. On a first side, or front face, of the printed circuit board assembly, the casing is formed into, for example, the user interface 1600 of FIG. 16, which can include the user-facing touchpad with the one or more physical buttons or the user-facing touchscreen with the one or more on-screen buttons configured to control a corresponding valve of the one or more valves 2755-2770. On a second side, or rear face, of the printed circuit board assembly, the one or more sensor connectors 1910, the one or more data ports 1912, and the one or more power connectors 1914 are exposed through the casing for making various connections.

FIG. 20 illustrates a close-up view of a rear face 2000 of the valve-controlling module 1900 for making various connections within the beverage dispensing system 2700 in accordance with some embodiments.

Again, on the rear face 2000 of the printed circuit board assembly, the one or more sensor connectors 1910, the one or more data ports 1912, and the one or more power connectors 1914 are exposed through the casing for making various connections. As shown, such ports and connectors can include sensor connectors such as a beverage container sensor connector 1910A, an empty keg detector connector 1910B, or a beverage flow meter connector 1910C; the solenoid connector 1908 for the solenoid 1706 of the valve-actuating assembly 1710; the data port 1912 for sending at least sensor data from the valve-controlling module 1900 to the central module 1800; and two power connectors 1914A and 1914B for daisy chaining two or more valve-controlling modules 1900.

FIG. 21 illustrates a dispensing logic diagram 2100 of the embedded system 1760 for beverage dispensation in accordance with some embodiments.

The beverage dispensing system 2700 can include dispensing logic to control electrical and mechanical components. The dispensing logic can be performed by hardware (circuitry, dedicated logic, state machines, etc.), software, or a combination thereof among the central module 1800 and the one or more valve-controlling modules 1900 of the embedded system 1760. As such, the hardware, the software, or the combination thereof of the dispensing logic described below is described with respect to a combination the central module 1800 and the one or more valve-controlling modules 1900. The dispensing logic can be implemented with combinational logic and finite state machines. The dispensing logic can include one or more application specific integrated chips ("ASICs"), one or more field programmable gate arrays ("FPGAs"), or processors, or any combination thereof. Software can be used and can include machine instructions. Information can be received from peripheral devices. Information can be displayed on the peripheral devices.

Referring to FIG. 21, the dispensing logic can include a processor 3305 and memory 3310 that can be configured to store information and instructions. The dispensing logic can include electrical circuits including bus 3350 that allows information to be sent by and to the processor 3305. Information can be sent to the processor 3305 by the beverage container sensor 1714 to indicate proper placement of a beverage container. Information can also be sent to the processor 3305 by the fluid sensor 1708 to indicate the amount of beverage flow based on the rotation of the turbine 2327. A timer 3355 can be used to determine flow times and rates. The processor 3305 can send information to the actuator assembly 1710 to cause the solenoid 1706 in the actuator assembly 1710 to move and cause the beverage to flow. The memory 3310 can store instructions and/or information that allow the processor 3305 to calculate and determine the volume of the beverage to be dispensed to a beverage container.

The processor 3305 can receive information from and can display information on the user interface 2772 or 1600. The implementation of the user interface 2772 or 1600 can includes an auto mode module 3352 to allow a user to set the automatic filling mode, a manual mode module 3255 to allow the user to set the manual filling mode. The user interface 2772 or 1600 can also include the beverage container size module 3357 to allow the user to specify the size or volume of the beverage container to receive the beverage, and the filling control module 3360 to allow the user to adjust the volume to be dispensed to the beverage container.

Power module 3362 can be used to power on or power off the beverage dispensing system 2700. Status module 3358 can be used to display status information to the user. This can include information about the beverage dispensing system 2700 being ready to dispense or not ready to dispense. Although not described, the dispensing logic can also include other modules to enable the beverage dispensing system 2700 to dispense the beverage into the beverage container according to the embodiments described herein.

Self-Service Beverage Client-Server System

FIG. 22 illustrates a self-service beverage client-server system 2200 for beverage dispensation in accordance with some embodiments.

As shown among FIGS. 18, 19, and 22, the self-service beverage client-server system 2200 includes a mobile web application 2202 for a mobile device, one or more programs (e.g., the payment processing program 1834 or one or more other programs 1844) of an embedded system (e.g., the embedded system 1760) of a beverage dispensing system (e.g., the beverage dispensing system 2700), and an application stack supported by at least one server host (e.g., any server host of server hosts 2206, 2208, and 2210) of the backend system 2204. The one or more programs of the embedded system 1760 are configured to run at least in part from a primary memory (e.g., a random-access memory ["RAM"] 1844) of a central module (e.g., the central module 1800), the one or more programs including at least a payment processing program (e.g., the payment processing program 1834) of the central module. The one or more programs of the embedded system 1760 are further configured to run at least in part from a primary memory (e.g., RAM 1916) of a valve-controlling module (e.g., the valve-controlling module 1900), the one or more programs including at least a valve-controlling program (e.g., the valve-controlling program 1904) of the valve-controlling module 1900. The application stack is configured to run at least in part from a primary memory (e.g., RAM) of the at least one server host of the backend system 2204, the application stack including a web server, an application server configured to serve the mobile web application 2202, a database server, and a database.

The mobile web application 2202 can be configured to run at least in part from a primary memory (e.g., RAM) of a mobile device and present a self-service GUI within a mobile web browser on a touchscreen of the mobile device. The self-service GUI can include a plurality of consumer-selectable self-service beverage options selected from at least beverage type, beverage brand, amount of beverage, and beverage cost. The self-service GUI can further include one or more payment processing options such as Samsung Pay, Android Pay, or Apple Pay connected with the self-service beverage options. In addition to the foregoing mobile web application 2202, a same or different mobile web application can be configured to present an owner or lessee GUI within a mobile web browser on a touchscreen of his or her mobile device for interacting with the beverage dispensing system 2700 in support of beverage dispensation of any kind disclosed herein.

The backend system 2204 can be configured to serve the mobile web application 2202 to one or more users (e.g., consumers, owners, or lessees) near a particular beverage dispensing system such as the beverage dispensing system 2700 and present an appropriate GUI (e.g., self-service GUI, owner GUI, or lessee GUI) to each of the one or more users near the particular beverage dispensing system 2700. User proximity to any one or more beverage dispensing systems can be determined by GPS-based comparisons.

The one or more users near the particular beverage dispensing system 2700 can be, for example, consumers, and the backend system 2204 can be configured to present the self-service GUI to the consumers near the beverage dispensing system 2700 to facilitate payment for beverages through one or more point-of-sale service providers. Consumer age verification can be likewise processed. That is, the backend system 2204 can be configured to facilitate age verification for adult beverages with the self-service GUI for the consumers near the beverage dispensing system 2700 through one or more identity or age verification service providers. The backend system 2204 can be further configured to present a customized self-service GUI to the consumers near the beverage dispensing system 2700, wherein the self-service GUI is customized in accordance with the beverage dispensing system's stock as communicated to the backend system 2204 by the embedded system 1760 or an owner or lessee respectively through the owner or lessee GUI.

The one or more users near the particular beverage dispensing system 2700 can be, for example, owners or lessees, and the backend system 2204 can be configured to respectively present the owner or lessee GUI to those of the foregoing near the beverage dispensing system 2700 for interacting with the beverage dispensing system 2700 such as remotely operating the beverage dispensing system 2700. Remotely operating the beverage dispensing system 2700 can also be effected using a handheld remote control.

FIG. 23 illustrates a remotely controlled beverage dispensing system 2300 remotely operable by a handheld remote control 2302 in accordance with some embodiments.

The beverage dispensing system 2300, which can stand alone or be a part of the self-service beverage client-server system 2200, can further include one or more handheld remote controls such as the handheld remote control 2302 as shown. At least one communication interface (e.g., IR receiver, BT receiver, etc.) of the one or more communication interfaces 1808 of the central module 1800 of the embedded system 1760 of the beverage dispensing system 2300 (see FIGS. 17 and 18) can be configured to communicate (e.g., unidirectionally communicate) with at least one handheld remote control or an IR or BT transmitter thereof. The handheld remote control 2302 can be configured to enable one or more users of the beverage dispensing system 2300 such as one or more owners or lessees to interact with the beverage dispensing system 2300 or control one or more functions thereof.

Methods

FIG. 24 illustrates a self-service beverage method 2400 for the self-service beverage client-server system 2000 in accordance with some embodiments.

As shown, the method 2400 includes a number of steps for the self-service beverage method. However, not every step of the method 2400 is required nor does every step need to be performed in the order presented. For example, any one or the first step 2410, the third step 2430, the fourth step 2440, or the fifth step 2450 can be performed first.

In a first step 2410 of the method 2400, a mobile web application is instantiated in a primary memory of a mobile device.

In a second step 2450 of the method 2400, a self-service GUI is presented within a mobile web browser on a touchscreen of the mobile device. The self-service GUI includes a plurality of consumer-selectable self-service beverage options selected from at least beverage type, beverage brand, amount of beverage, and beverage cost. The self-service GUI further includes one or more payment processing options such as Samsung Pay, Android Pay, or Apple Pay connected with the self-service beverage options.

In a third step 2430 of the method 2400, a payment processing program is instantiated in a primary memory of a central module of an embedded system of a beverage dispensing system. The self-service beverage method can further include using the payment processing program to directly communicate with one or more point-of-sale service providers such as Oracle Hospitality (formerly Micros®) by way of at least one networking interface of the one or more networking interfaces of the central module or indirectly communicate with the one or more point-of-sale service providers by way of the at least one networking interface through a backend system.

In addition to the payment processing program, an age verifying program can also be instantiated in the primary memory of the central module of the embedded system of the beverage dispensing system. The self-service beverage method further includes verifying consumer age with the age verifying program by directly communicating with one or more identity or age verification service providers with at least one networking interface of one or more networking interfaces of the central module or indirectly communicating with the one or more identity or age verification service providers with the at least one networking interface through the backend system. Additionally or alternatively, consumer age can be verified by reading a consumer-worn RFID tag with an RFID tag reader of the central module. The RFID tag can be issued in a bracelet subsequent to a manual age verification at an entry of a venue in which the beverage dispensing system is located.

In addition to the payment processing program, a global positioning program can also be instantiated in the primary memory of the central module of the embedded system of the beverage dispensing system. The self-service beverage method further includes determining a global position of the beverage dispensing system and a global position of a consumer with the global positioning program. Determining the global position of the beverage dispensing system includes determining the global position with a GPS receiver of the central module including a GPS antenna and a GPS processor. Determining the global position of the consumer includes determining the global position by way of a location shared by a consumer-associated mobile device with the beverage dispensing system through the mobile web application.

In a fourth step 2440 of the method 2400, a valve-controlling program is instantiated in a primary memory of a valve-controlling module of the embedded system of the beverage dispensing system. A valve-actuating assembly of a valve of the beverage dispensing system is kept locked with the valve-controlling program until payment for one or more beverages is successfully processed by the payment-processing program through the one or more point-of-sale providers, consumer age is successfully verified by the age verifying program for one or more adult beverages through the one or more identity or age verification service providers, global position of the consumer and the global position of the beverage dispensing system are verified by the global positioning program as the same global position, or some combination of the foregoing.

In a fifth step 2450 of the method 2400, an application stack is instantiated at least in part in a primary memory of at least one server host of the backend system. Instantiating the application stack includes operating a web server, an application server configured to serve the mobile web application, a database server, and a database from the at least one server host.

The self-service beverage method further includes performing analytics with respect to beverage dispensation.

In a first example, such analytics include determining a number of ounces poured for any one or more beverages per beverage container, consumer, or unit of time using data from one or more beverage flow meters respectively corresponding to one or more valves of the beverage dispensing system, the payment processing program, a real-time clock of the central module of the beverage dispensing system, or a combination thereof.

In a second example, such analytics include alerting an owner or lessee (e.g., restaurant, bar, etc.) of the beverage dispensing system through the mobile web application of an empty keg (e.g., beer keg, soda keg, etc.) using data from an empty keg detector of the beverage dispensing system.

In a third example, such analytics include determining a temperature for any one or more beverages using data from one or more beverage temperature sensors, the payment processing program, the real-time clock of the central module of the beverage dispensing system, or a combination thereof.

In a fourth example, such analytics include determining a time of day each beverage was served using data from the payment processing program and the real-time clock of the central module of the beverage dispensing system.

In a fifth example, such analytics include alerting the owner or lessee when one or more beverage lines of the beverage dispensing system need to be cleaned using data from one or more clear object detectors respectively corresponding to the one or more valves of the beverage dispensing system.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures can be made from the particular embodiments disclosed herein without departing from the scope of the concepts provided herein.

What is claimed is:

1. A beverage dispensing system, comprising:
a housing including a dispensing platform;
a plurality of valves at least partially below the dispensing platform, each valve of the plurality of valves including a beverage-container coupler extending from each valve through a corresponding opening in the dispensing platform configured to couple with bottom-fillable beverage containers for use with the beverage dispensing system;
a plurality of valve-controlling modules, each valve-controlling module of the plurality of valve-controlling modules disposed within a casing, and received within a cutout of the housing, each of the plurality of valve-controlling modules including a user-facing touchpad for a user interface having one or more buttons configured to control a corresponding valve of the plurality of valves and a printed circuit board assembly with surface-mounted components including a microcontroller with at least a valve-controlling program stored in a memory thereof, the surface-mounted components including a solenoid connector configured for connecting and controlling a solenoid of a valve-actuating assembly, one or more sensor connectors configured for respectively connecting and controlling one or more sensors, one or more data ports configured for sending at least sensor data from each valve-controlling module, and one or more power connectors; and
an embedded system within the housing and including the plurality of valve-controlling modules and a central module communicatively coupled to the plurality of valve-controlling modules, the embedded system configured for beverage dispensation and a function related to beverage dispensation selected from a group consisting of analytics, communications, payment processing, and a combination thereof.

2. The beverage dispensing system according to claim 1, wherein the central module includes the printed circuit board assembly with surface-mounted components selected from the group consisting of the microcontroller with one or more programs related to beverage dispensation stored in the memory thereof, one or more networking interfaces configured for external networking, one or more communication interfaces configured for direct operation of the beverage dispensing system, one or more data ports configured for receiving at least sensor data from one or more valve-controlling modules, non-volatile memory or a connector configured for removable non-volatile memory, and one or more power connectors.

3. The beverage dispensing system according to claim 2, wherein the networking interfaces is selected from a group consisting of:
one or more wired networking interfaces including an ethernet port and an associated microchip,
one or more wireless networking interfaces including one or more transmitter-receivers or transceivers and at least one associated microchip configured for Wi-Fi, Bluetooth®, near-field communication ("NFC"), or a combination thereof, and
a combination thereof.

4. The beverage dispensing system according to claim 2, wherein:
at least one networking interface of the networking interfaces is configured to communicate with one or more point-of-sale service providers, and
one or more valve-actuating assemblies are configured to remain locked until payment for one or more beverages is successfully processed by way of the one or more point-of-sale service providers, consumer age is verified by way of an identity or age verification service provider or a radio frequency identification ("RFID") tag, consumer location is verified by way of a consumer-associated mobile device, or a combination thereof.

5. The beverage dispensing system according to claim 1, wherein the central module includes a Global Positioning System ("GPS") receiver including a GPS antenna and a GPS processor configured to determine a global position of the beverage dispensing system.

6. The beverage dispensing system according to claim 1, wherein the central module includes a statistics module configured for statistical analyses of sensor data from one or more sensors provided by way of the plurality of valve-controlling modules, the sensors selected from at least a beverage flow meter, a beverage temperature sensor, and one or more environmental sensors.

7. The beverage dispensing system according to claim 6, wherein the central module includes an analytics module configured to determine patterns from at least the statistical analyses of the sensor data, time of day from a real-time clock of the central module, payment processing data, or a combination thereof.

8. The beverage dispensing system according to claim 1, further comprising a clear object detector associated with each valve of the plurality of valves, the clear object detector configured for detecting clarity in a beverage line leading to its valve.

9. The beverage dispensing system according to claim 1, further comprising a beverage container position sensor associated with each valve of the plurality of valves, the beverage container position sensor configured for detecting beverage container position on the beverage-container coupler of its respective valve before any beverage dispensation.

* * * * *